United States Patent
Hsu et al.

(10) Patent No.: US 11,363,183 B2
(45) Date of Patent: Jun. 14, 2022

(54) LINKAGE MECHANISMS FOR CAMERAS

(71) Applicant: Hewlett-Packard Development Company, L.P., Spring, TX (US)

(72) Inventors: Chen-Fang Hsu, Taipei (TW); Yu-Chen Cheng, Taipei (TW); Chi-Chung Ho, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/052,353

(22) PCT Filed: Nov. 29, 2018

(86) PCT No.: PCT/US2018/063038
§ 371 (c)(1),
(2) Date: Nov. 2, 2020

(87) PCT Pub. No.: WO2020/112110
PCT Pub. Date: Jun. 4, 2020

(65) Prior Publication Data
US 2021/0281730 A1    Sep. 9, 2021

(51) Int. Cl.
*G06V 40/13* (2022.01)
*H04N 5/225* (2006.01)
(Continued)

(52) U.S. Cl.
CPC ......... *H04N 5/2257* (2013.01); *G06F 1/1686* (2013.01); *G06F 21/32* (2013.01);
(Continued)

(58) Field of Classification Search
CPC .... H04N 5/2257; H04N 5/2252; G06V 40/13; G06V 10/147; G06F 2203/0338; G06F 1/1686; G06F 21/32
See application file for complete search history.

(56) References Cited

U.S. PATENT DOCUMENTS 9,977,944 B2    5/2018  Ramrattan et al.
2006/0008129 A1  1/2006  Lee et al.
(Continued)

FOREIGN PATENT DOCUMENTS

CN    106933351  *  7/2017  ............. G06F 3/011
CN    107071105  *  8/2017  ............. H04M 1/026
(Continued)

OTHER PUBLICATIONS

Chris Davies, Huawei MateBook X Pro hides popup webcam in svelte 3k laptop, SlashGear, Feb. 25, 2018, 9 pgs.
(Continued)

*Primary Examiner* — Jonathan A Boyd
(74) *Attorney, Agent, or Firm* — Rahman LLC

(57) ABSTRACT

An example apparatus includes a camera cover connected to a housing; a linkage mechanism actuated by the camera cover; and a camera connected to the linkage mechanism. The camera is retained in the housing during a fingerprint-sensing mode. The camera is to extend above the camera cover in a media-capturing mode via the linkage mechanism based on a sliding movement of the camera cover. A light source may be provided under the camera cover to emit light. A lens may direct the light towards the camera cover. The camera cover may be transparent to permit the light to be directed towards a fingerprint positioned over the camera cover. The camera may be positioned under the camera cover to capture an image of the fingerprint. The camera cover may be positioned to retain the camera under the camera cover prior to slidable movement of the camera cover.

20 Claims, 15 Drawing Sheets

(51) Int. Cl.
*G06F 21/32* (2013.01)
*G06F 1/16* (2006.01)
*G06V 10/147* (2022.01)

(52) U.S. Cl.
CPC ............ *G06V 10/147* (2022.01); *G06V 40/13* (2022.01); *H04N 5/2252* (2013.01); *G06F 2203/0338* (2013.01)

(56) References Cited

U.S. PATENT DOCUMENTS

| | | |
|---|---|---|
| 2008/0080751 A1 | 4/2008 | Bee et al. |
| 2011/0012758 A1 | 1/2011 | Wu et al. |
| 2014/0126783 A1 | 5/2014 | Nagasaka et al. |
| 2018/0046840 A1 | 2/2018 | Howell et al. |

FOREIGN PATENT DOCUMENTS

| | | |
|---|---|---|
| EP | 1216451 | 8/2003 |
| WO | WO-2012114643 | 8/2012 |

OTHER PUBLICATIONS

Derawi et al , Fingerprint Recognition with Embedded Cameras on Mobile Phones, Security and Communication Networks, 2012, John Wiley & Sons, Ltd., 13 pgs.

* cited by examiner

FIG. 1
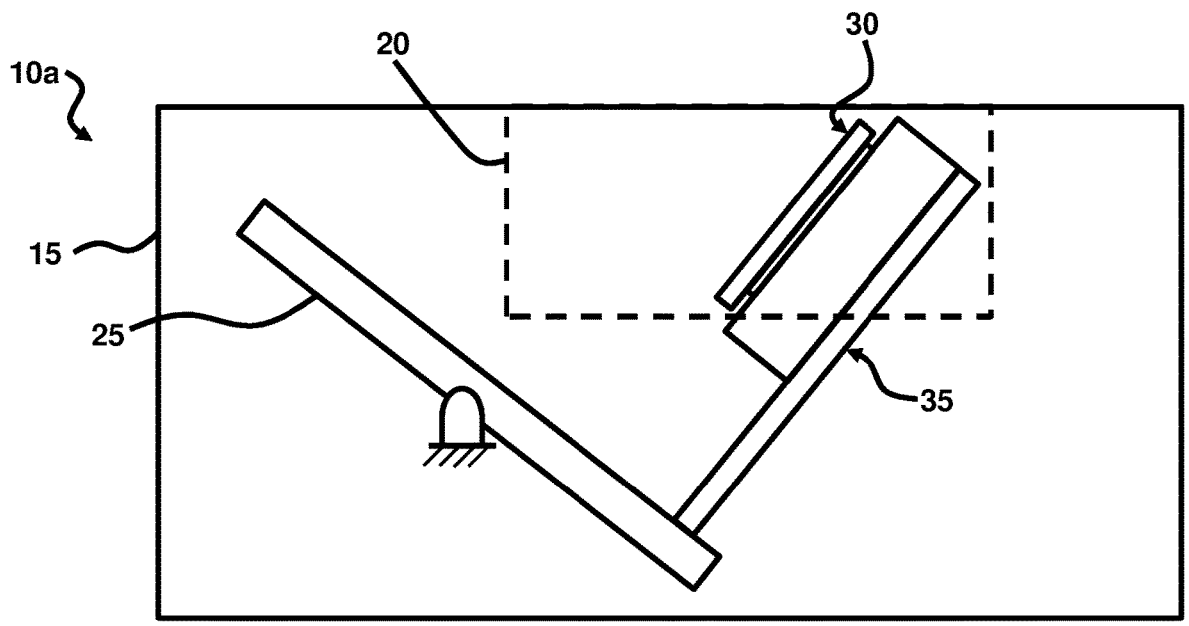
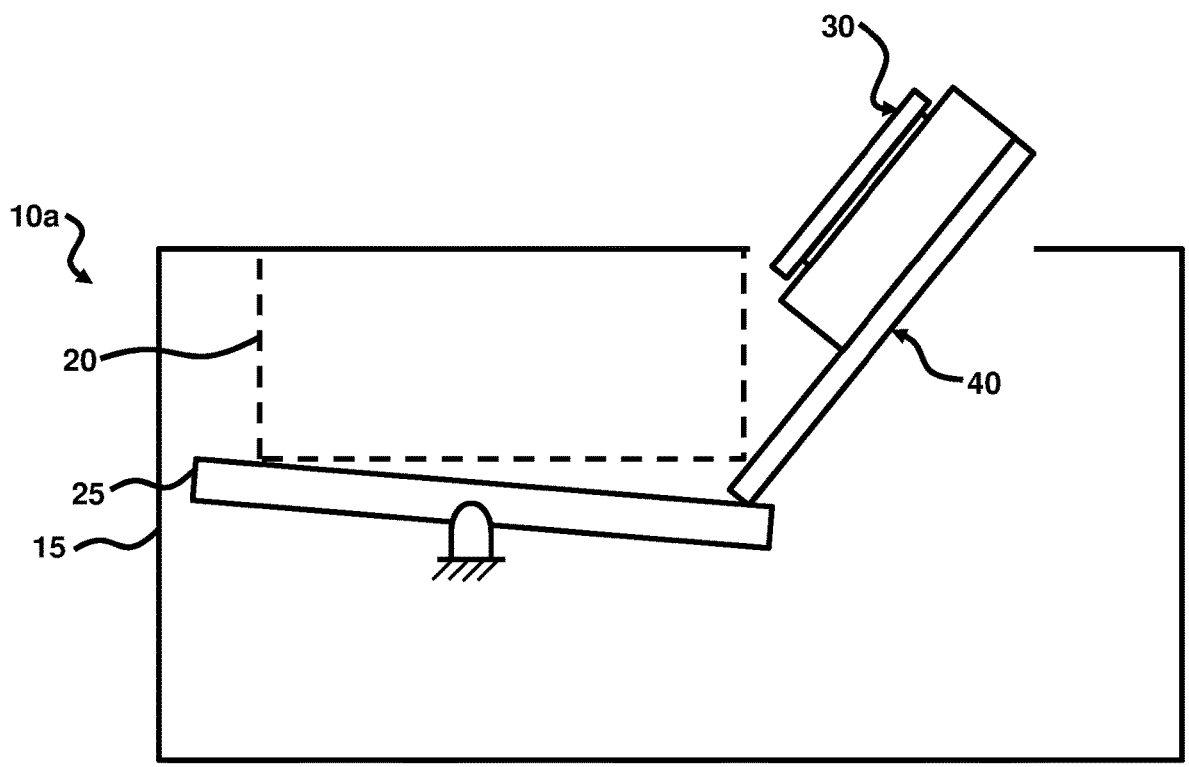

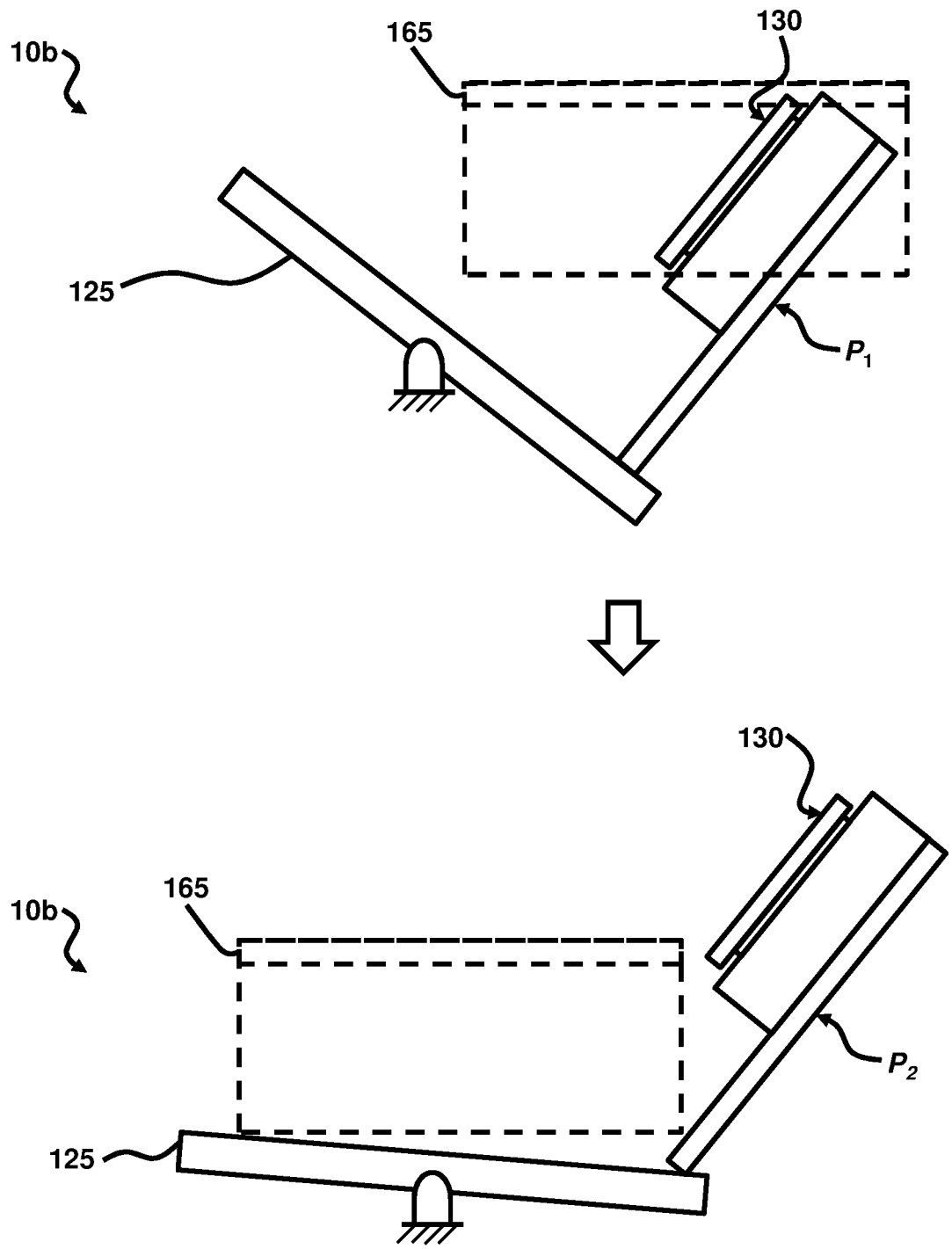

FIG. 6
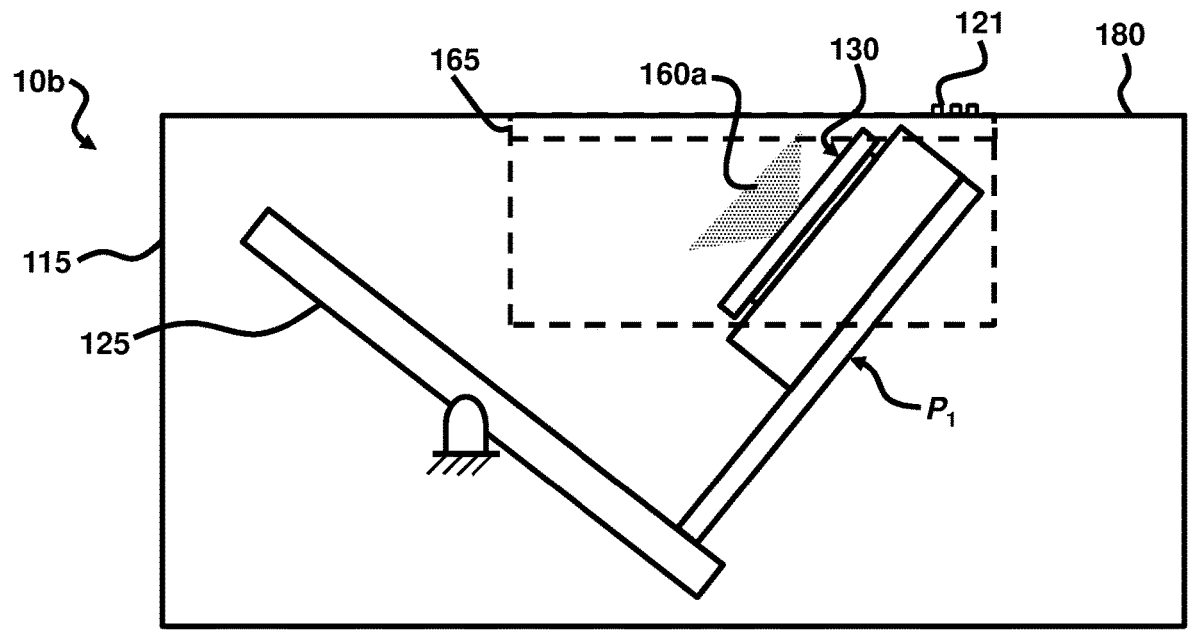
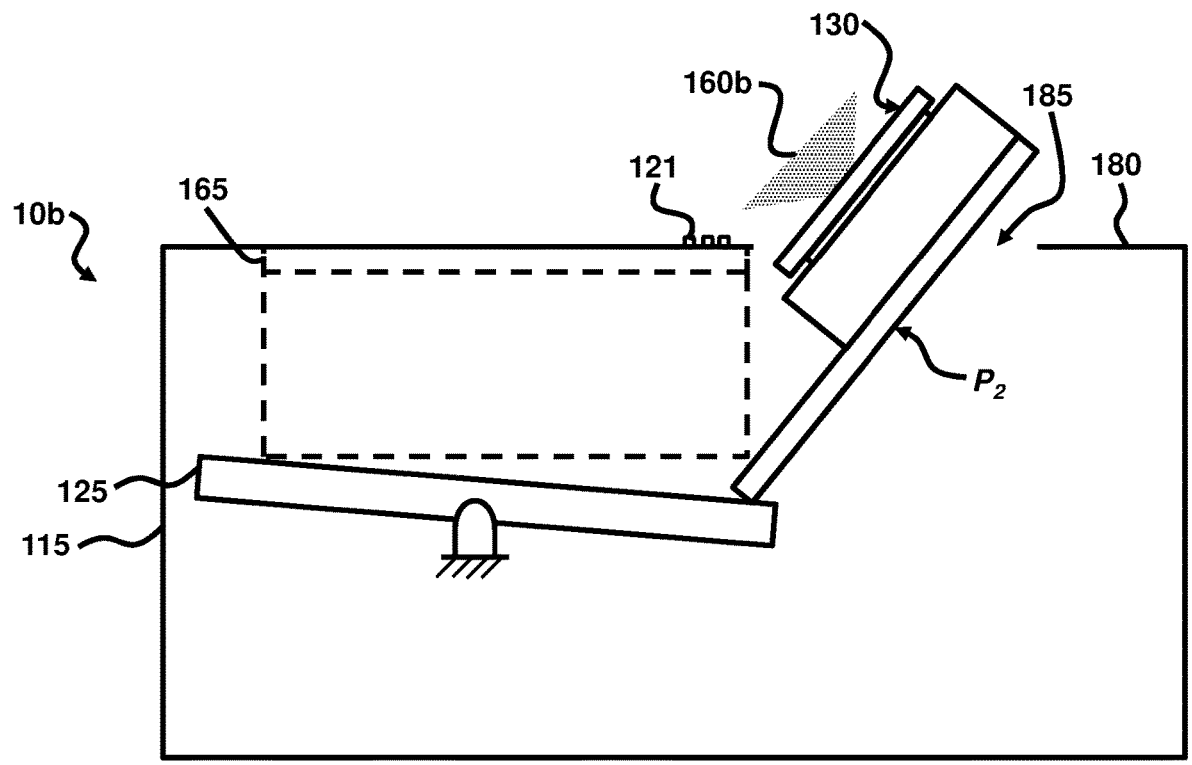

FIG. 7
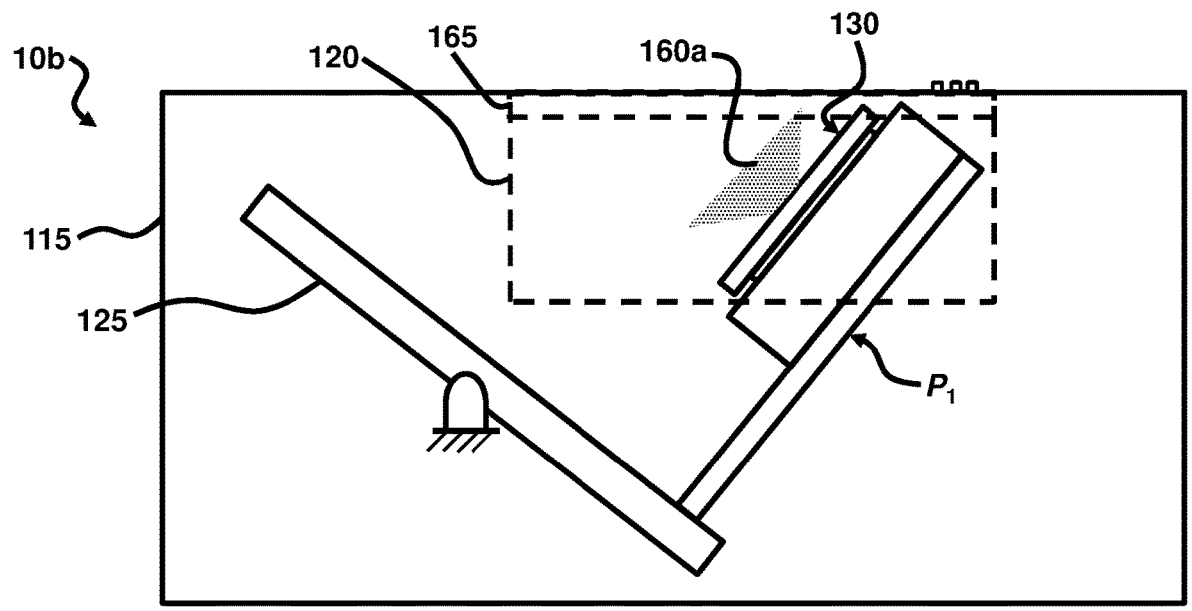
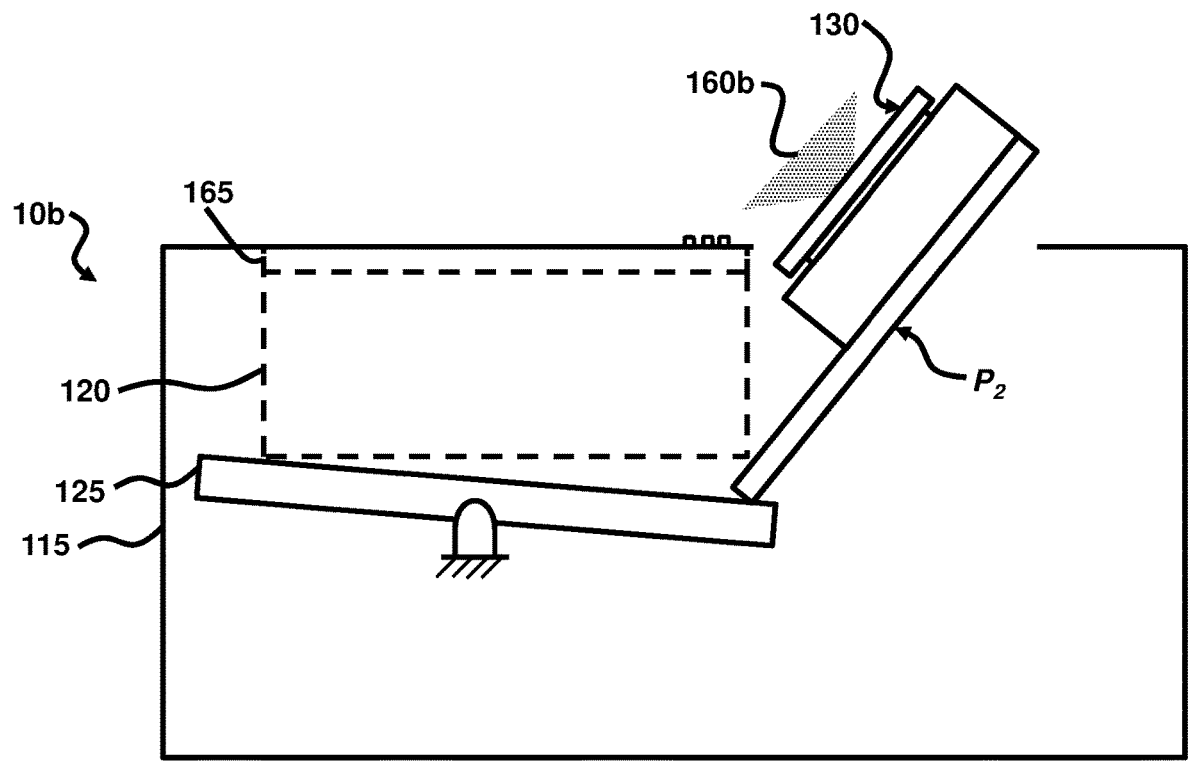

FIG. 8
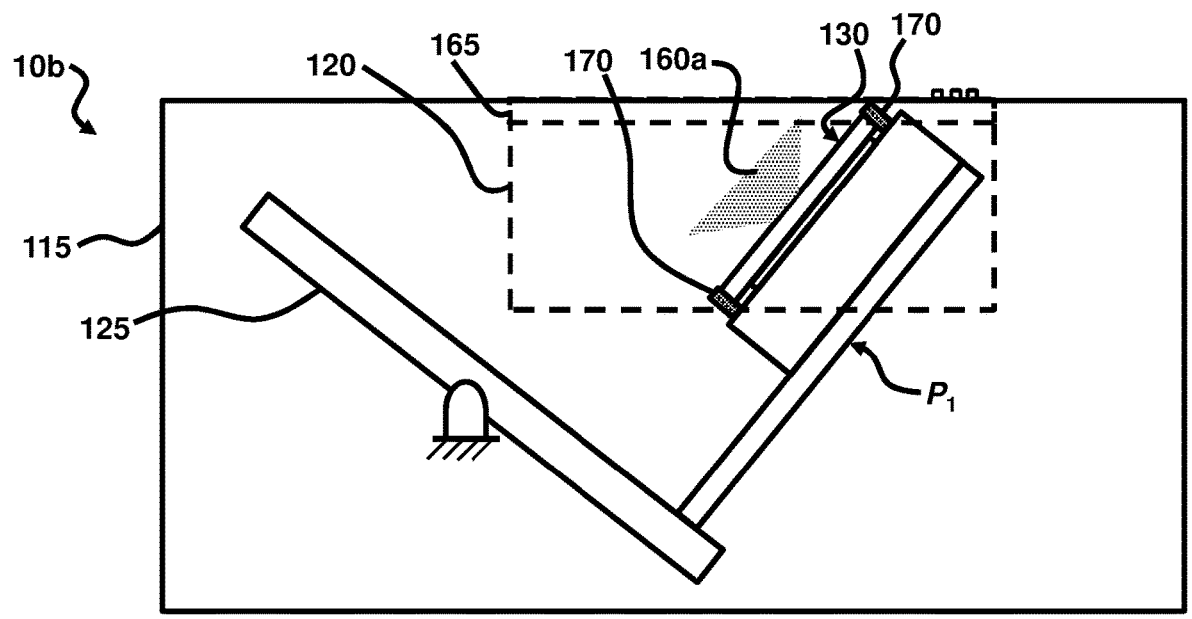
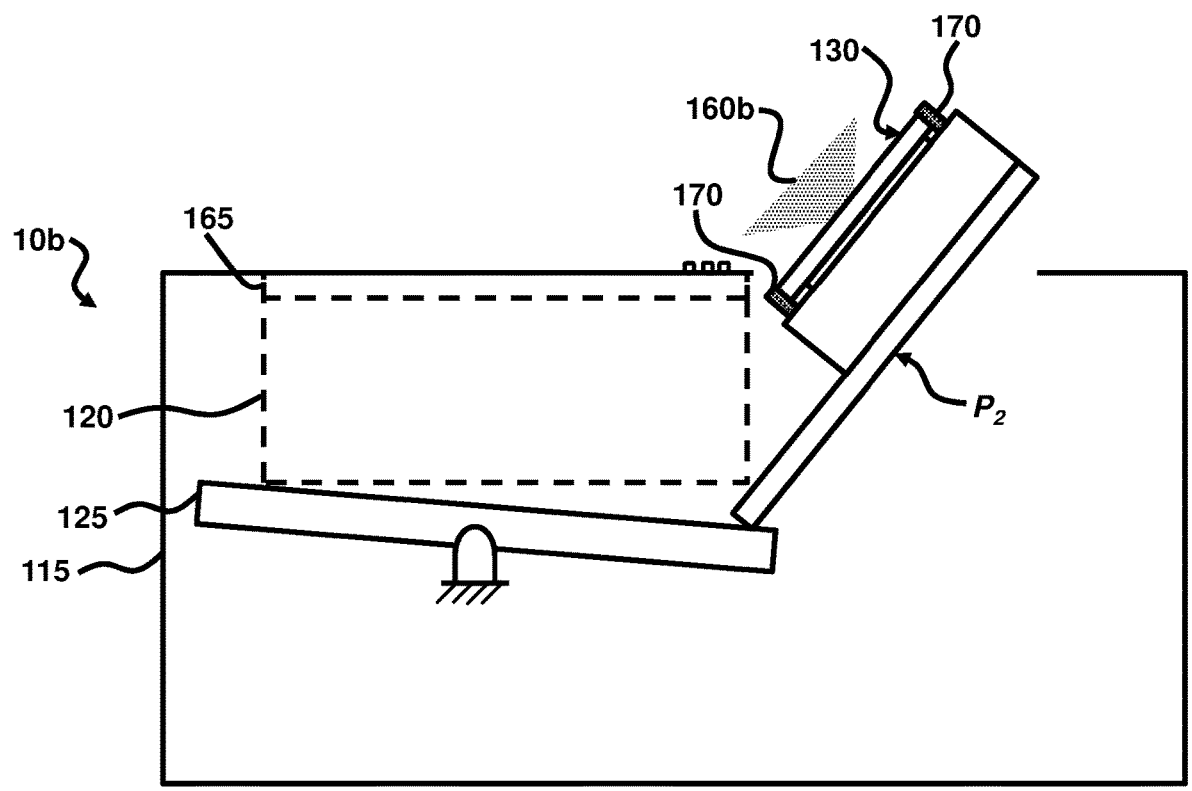

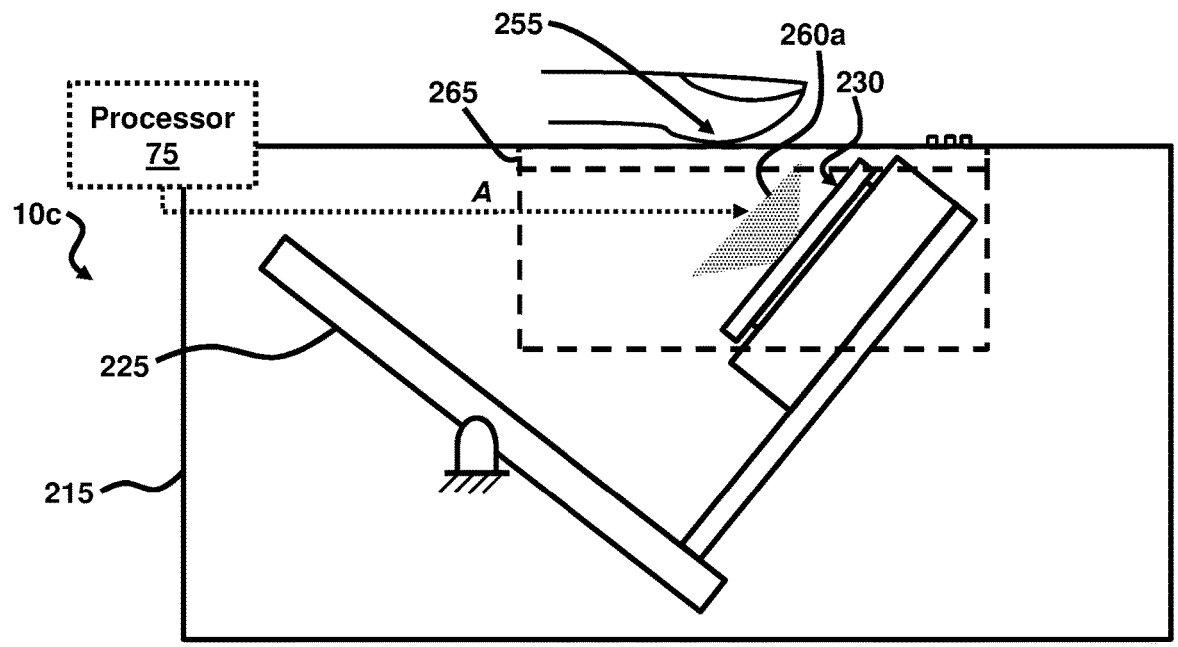
FIG. 10
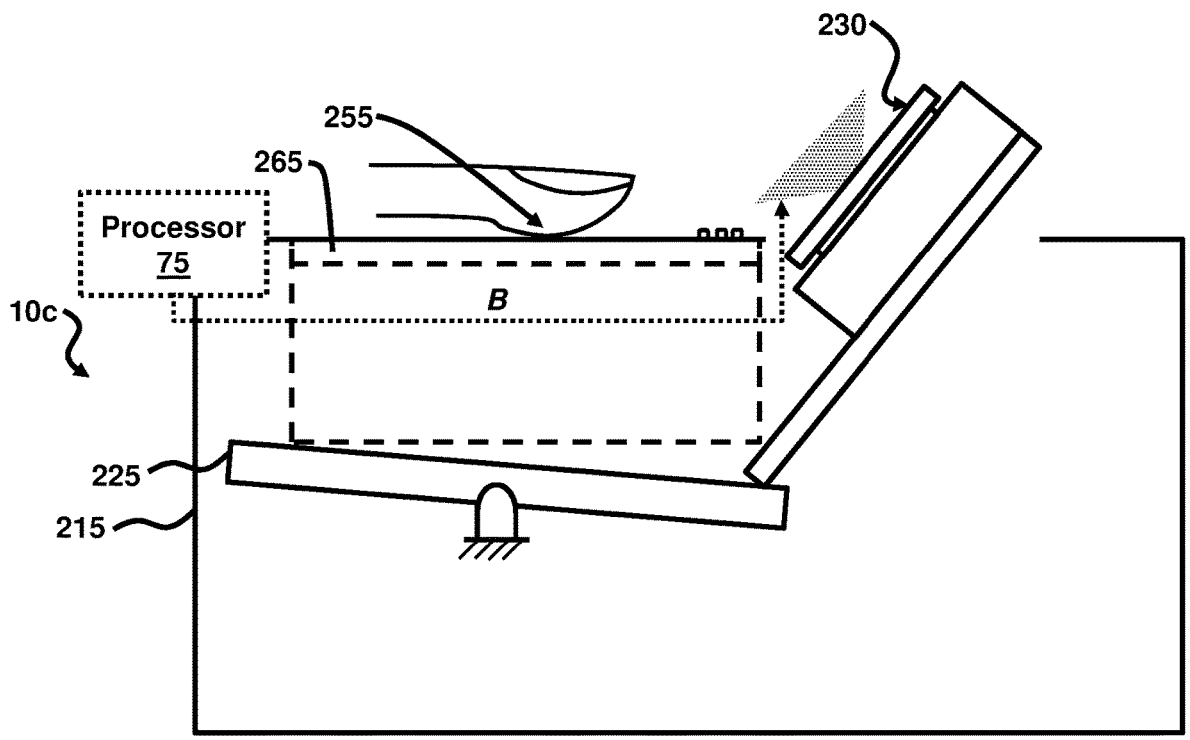

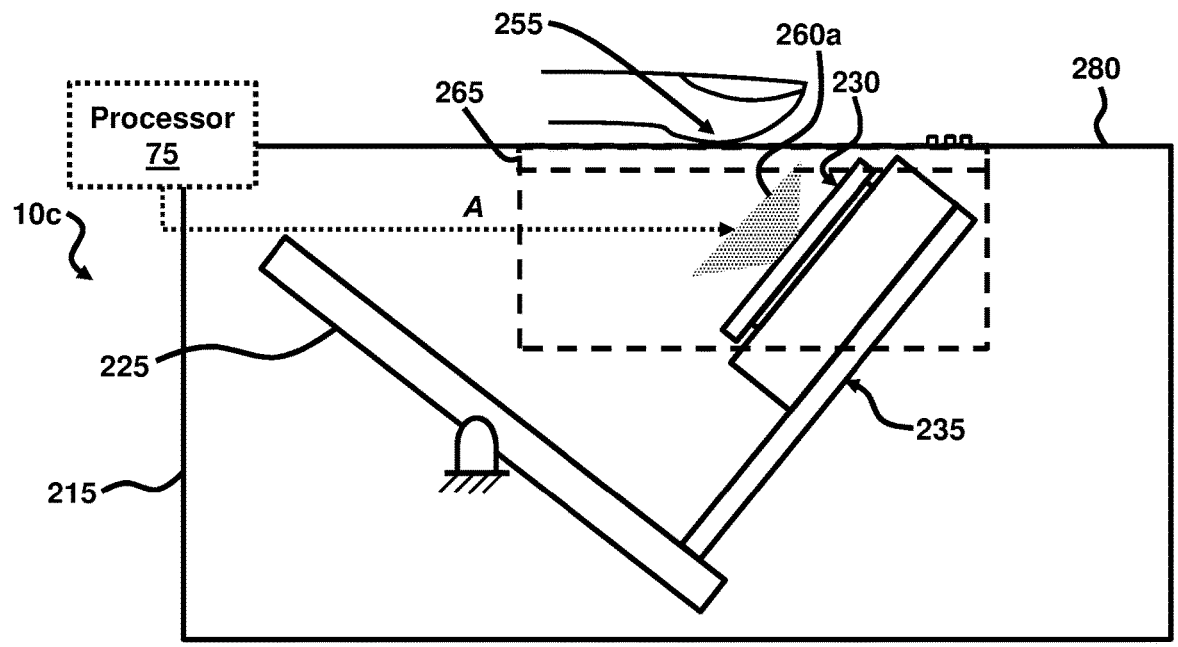
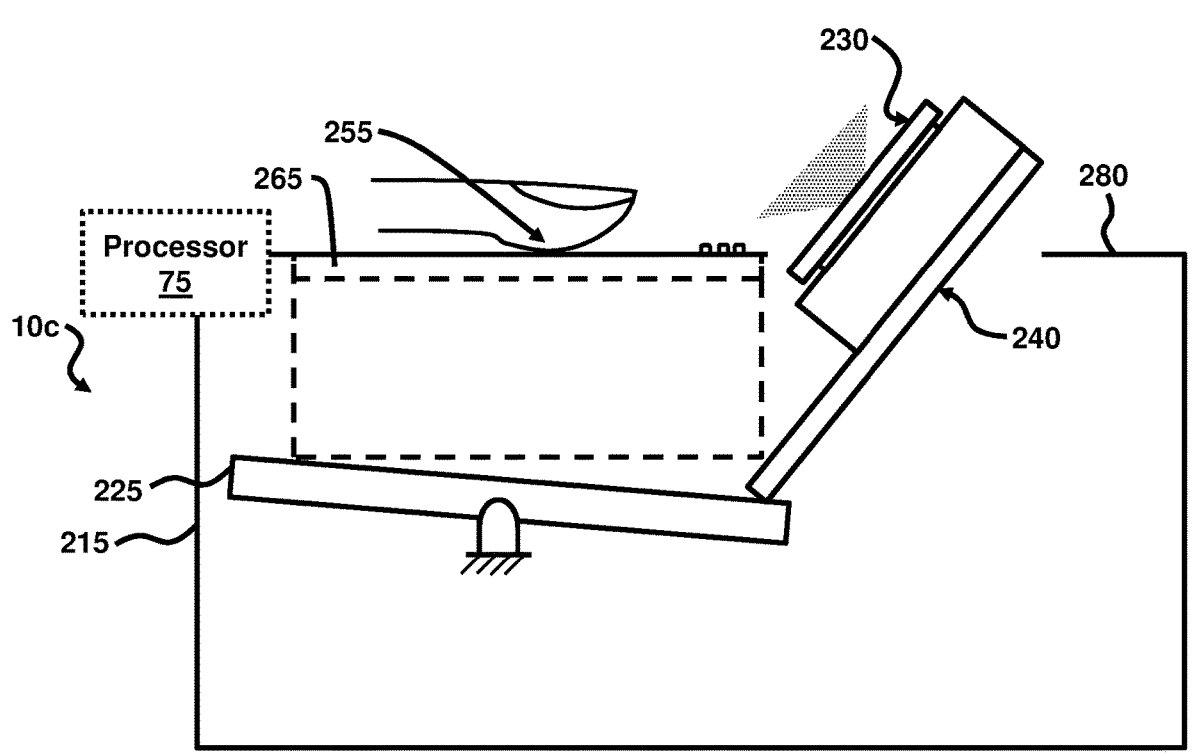
FIG. 11

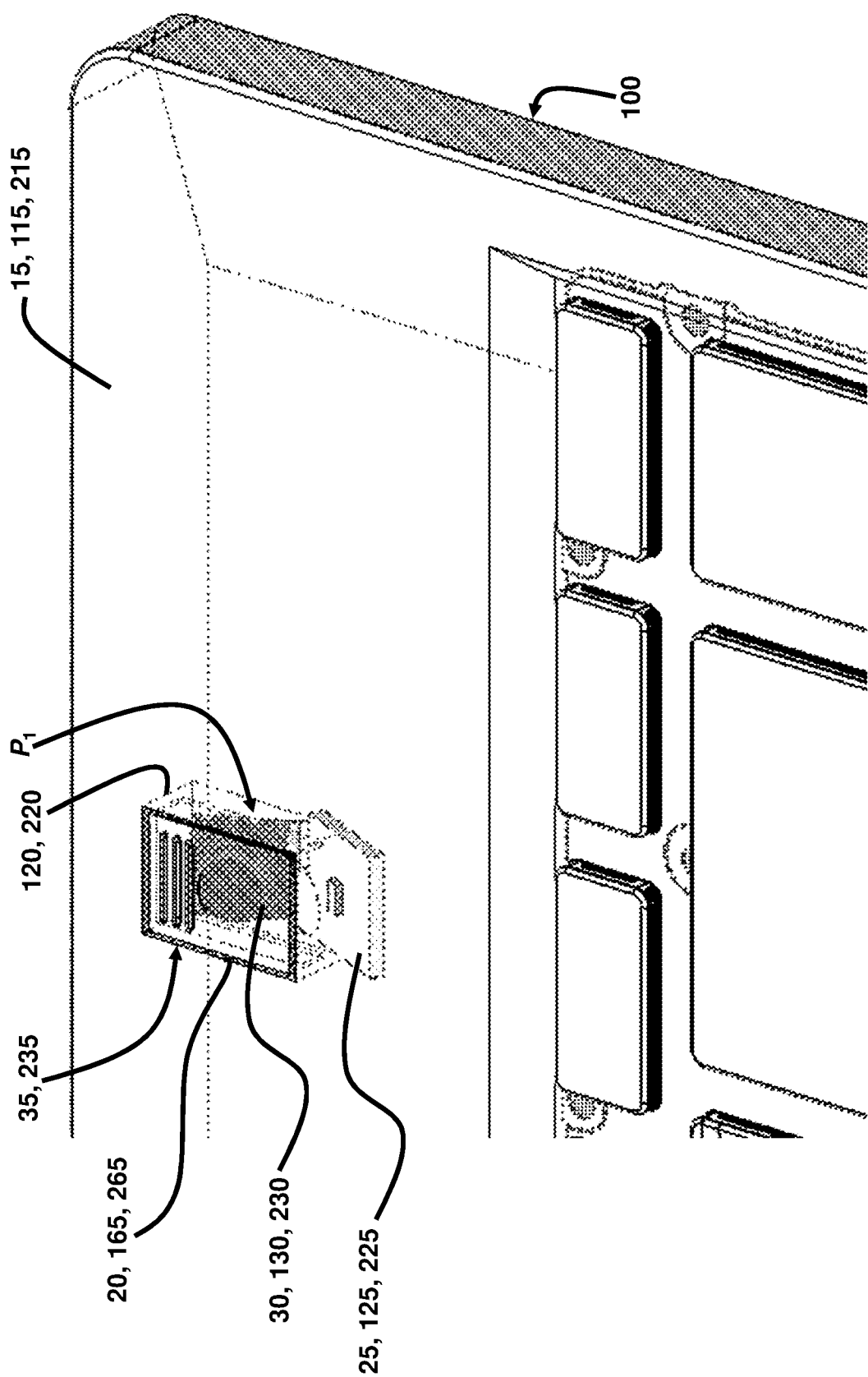

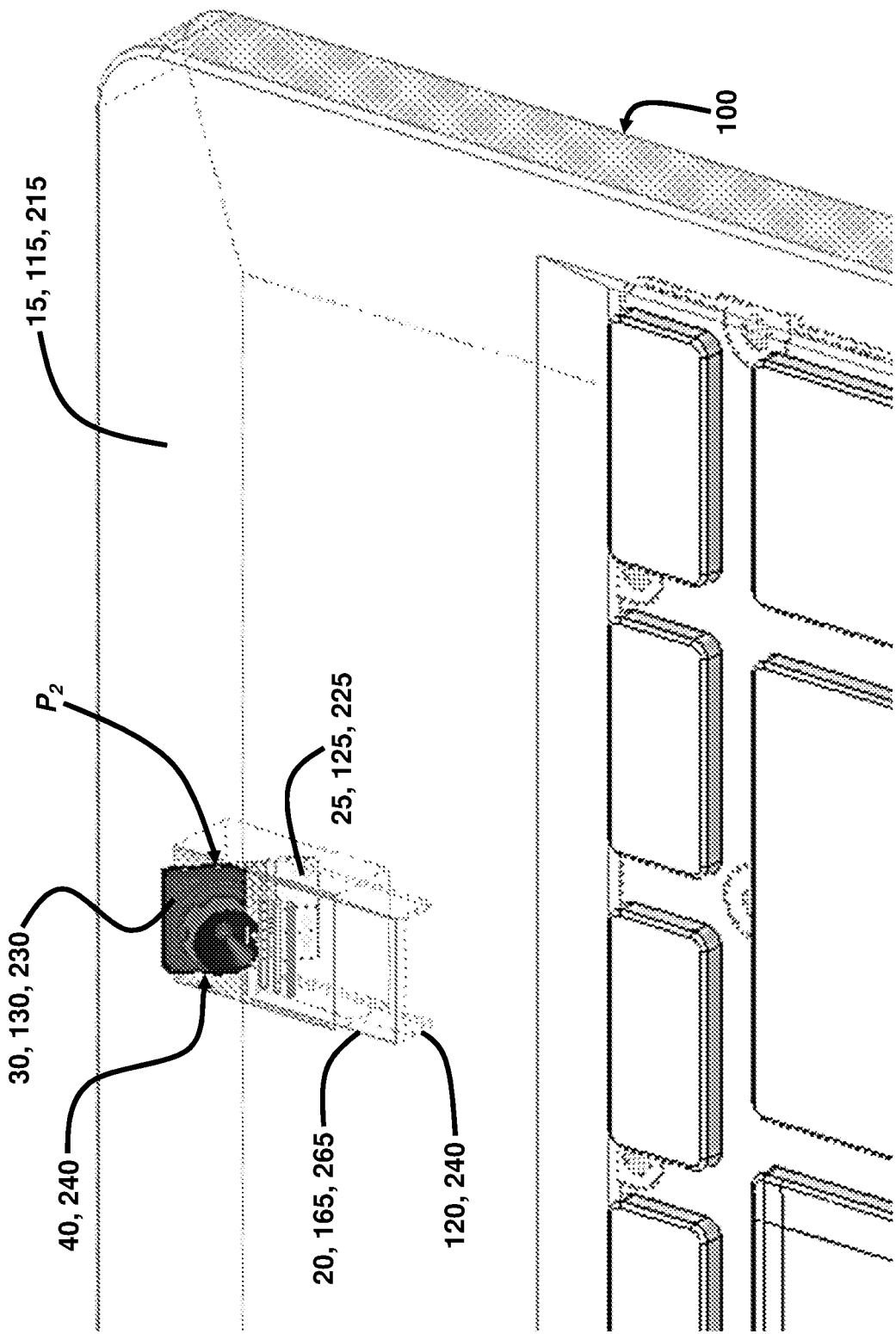

LINKAGE MECHANISMS FOR CAMERAS

BACKGROUND

Secured access to electronic devices such as laptop or notebook computers may be granted using authentication techniques. Some authentication techniques use facial recognition to grant a user access to the device. These devices may also contain built-in webcams to capture images or videos.

BRIEF DESCRIPTION OF THE DRAWINGS

The following detailed description references the drawings, in which:

FIG. 1 is a cross-sectional schematic diagram illustrating an apparatus with a camera that operates for sensing and image-capturing based on the actuation of a linkage mechanism, according to an example.

FIG. 5 is cross-sectional schematic diagram illustrating an apparatus with a camera moving from a first position to a second position, according to an example.

FIG. 6 is a cross-sectional schematic diagram illustrating the apparatus of FIG. 5 with multiple resolutions of images captured by a camera, according to an example.

FIG. 7 is a cross-sectional schematic diagram illustrating the apparatus of FIG. 5 with a moveable camera cover to engage a linkage mechanism, according to an example.

FIG. 8 is a cross-sectional schematic diagram illustrating a bumper mechanism operatively connected to the camera of the apparatus of FIG. 5, according to an example.

FIG. 10 is a cross-sectional schematic diagram illustrating an apparatus that performs an authentication operation and a media-capturing operation, according to an example.

FIG. 11 is a cross-sectional schematic diagram illustrating the apparatus of FIG. 10 operating in a fingerprint-sensing mode and a media-capturing mode, according to an example.

FIG. 16A is a schematic diagram illustrating any of the apparatuses of FIG. 1, 5, or 10 in a fingerprint-sensing mode and contained within a housing of an electronic device, according to an example.

FIG. 16B is a schematic diagram illustrating any of the apparatuses of FIG. 1, 5, or 10 in a media-capturing mode and extending out of a housing of an electronic device, according to an example.

Figure 2:
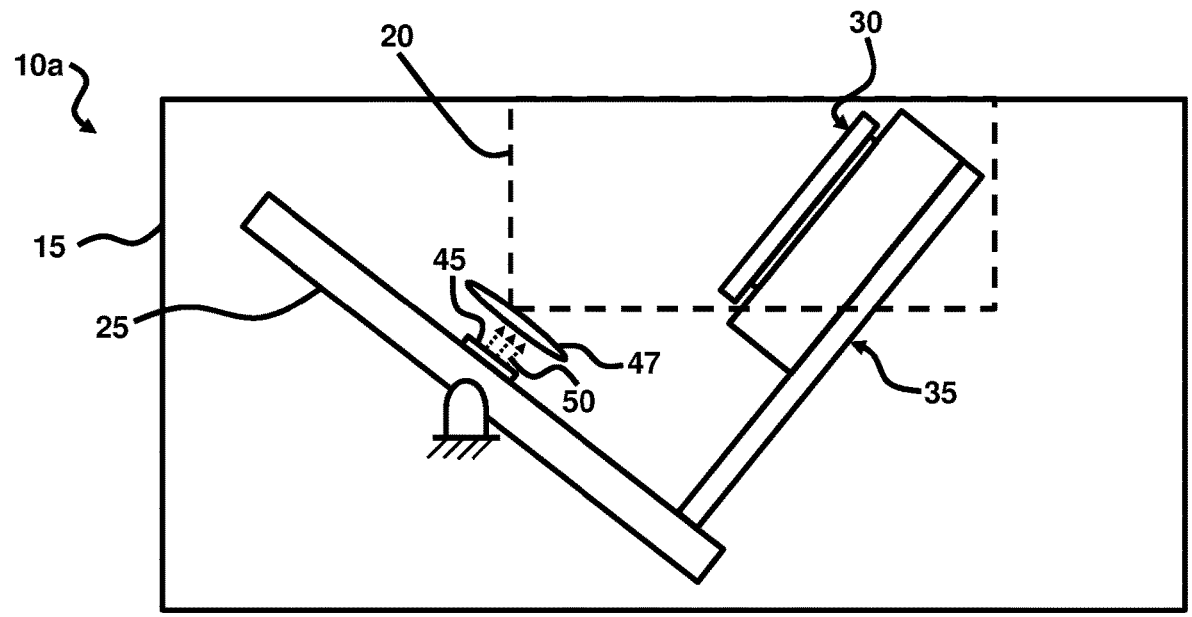
FIG. 2 is schematic diagram illustrating the apparatus of FIG. 1 with a light source to emit light and a lens to direct light towards a camera cover, according to an example.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Authentication techniques may rely on different user recognition methods to grant a user access to an electronic device such as a laptop, tablet, or notebook computer or other type of communication device such as a smartphone. Some authentication techniques rely on facial recognition, while others utilize some other biometric technique such as fingerprint authentication. Devices utilizing fingerprint authentication may contain a fingerprint reader or sensor to facilitate the biometric authentication. In some circumstances footprint requirements for electronic devices continue to shrink, causing designers to reconfigure the panel, bezel, or housing supporting the electronic device. Utilizing multi-function and integrated techniques for various hardware components may be utilized to assist in accommodating a smaller footprint requirement for the electronic device.

An example provides for a multi-function sensor and camera for a laptop computer or other similar computing device. The sensor and camera can operate in both a fingerprint security mode and a camera mode; i.e., image/video capturing, webcam, etc. mode. The camera's resolution may increase in the camera mode. In an example, the camera is positioned near the keyboard as opposed to on the display screen/monitor cover. Initially, the camera is positioned below the surface of the keyboard cover and under a slidable touch sensor. The touch sensor functions as a fingerprint security sensor such that a user may place his fingerprint on the sensor and the camera reads the fingerprint to permit access to the laptop. The user may then slide the touch sensor and in doing so a connected bar engages the camera and pushes it outward from the cover to point towards the user to use as a camera. The examples described below eliminate the need of having two separate components used for a fingerprint sensor and a webcam on an electronic device by having an integrated apparatus that supports both fingerprint authentication and webcam functions.

Another example provides an apparatus comprising a housing; a camera cover connected to the housing; a linkage mechanism actuated by the camera cover; and a camera connected to the linkage mechanism. The camera may be retained in the housing during a fingerprint-sensing mode, and the camera may extend above the camera cover in a media-capturing mode via the linkage mechanism based on a sliding movement of the camera cover. In an example, the apparatus may comprise a light source under the camera cover to emit light; and a lens to direct the light towards the camera cover. In an example, the camera cover may be transparent to permit the light to be directed towards a fingerprint positioned over the camera cover. In an example, the camera may be positioned under the camera cover to capture an image of the fingerprint. In an example, the camera cover may be positioned to retain the camera under the camera cover prior to slidable movement of the camera cover.

Another example provides an apparatus comprising a touch sensor; a linkage mechanism actuated by the touch sensor; and a camera connected to the linkage mechanism. The camera is to move from a first position below the touch sensor to a second position above the touch sensor via the linkage mechanism based on a sliding movement of the touch sensor. In an example, the camera may capture images at a higher resolution when the camera is at the second position than when the camera is at the first position. In an example, the apparatus may comprise a moveable transparent camera cover operatively connected to the touch sensor to engage the linkage mechanism to rotate upon slidable movement of the touch sensor. In an example, the apparatus may comprise a bumper mechanism operatively connected to the camera. In an example, the camera may be retractable to cause the linkage mechanism to become actuated to cause the touch sensor to slide over the camera.

Another example provides an apparatus comprising a housing; a touch sensor positioned on the housing to detect a presence of a fingerprint associated with an authentication operation; a linkage mechanism positioned within the housing and below the touch sensor. The linkage mechanism is to rotate upon slidable movement of the touch sensor; a camera positioned in the housing and operatively connected to the linkage mechanism to capture an image of the fingerprint; and a processor to perform the authentication operation using the image of the fingerprint. The camera is to slide out of the housing upon rotation of the linkage mechanism to perform a media-capturing operation. In an example, the camera may operate in a fingerprint-sensing mode upon being positioned in the housing and below the touch sensor. The camera is to operate in a media-capturing mode upon being positioned to slide out of the housing and above a surface of the housing. In an example, the apparatus may comprise a light source connected to the linkage mechanism and positioned to direct light towards the touch sensor to enhance an illumination of a detected fingerprint on the touch sensor to permit the camera to capture the image of the fingerprint. In an example, upon the touch sensor detecting the presence of the fingerprint, the touch sensor may activate operation of the light source and the camera, and upon the processor identifying the fingerprint, the processor may deactivate operation of the light source and the camera. In an example, upon the camera sliding out of the housing, the processor may activate operation of the camera, and retraction of the camera back into the housing may cause the processor to deactivate operation of the camera.

FIG. 1 illustrates an apparatus 10a comprising a housing 15. In an example, the housing 15 may be a panel, bezel, cover of an electronic device, which is not shown in FIG. 1, such as a laptop, tablet, or notebook computer. The housing 15 may comprise any suitable configuration, shape, or material suitable for containing the electronics and components of the electronic device. Moreover, the housing 15 shown in the figures may comprise any suitable portion of the panel, bezel, cover, etc. of an electronic device, and in an example, the housing 15 may be the keyboard cover or panel of a laptop, tablet, or notebook computer, or a communication device.

A camera cover 20 may be connected to the housing 15 in an example. The camera cover 20 may comprise any suitable configuration, shape, or material and may be arranged to be planar to the upper portion of the housing 15 or may extend over the upper portion of the housing 15 or be recessed with respect to the upper portion of the housing 15. The camera cover 20 may extend to any suitable depth within the housing 15, and in an example the camera cover 20 may be resilient such that it may be depressed by the application of a force; i.e., from a user's finger, etc., and may return to its original position upon removal of the force. In an example, the camera cover 20 may be hollow to house various components therein. In another example, the bottom portion of the camera cover 20 may be open. According to various examples, the camera cover 20 may be arranged at any suitable position in the housing 15. In one example, the camera cover 20 may be positioned adjacent to the keyboard, which is not shown in FIG. 1, of an electronic device such as a laptop computer, etc. More particularly, the camera cover 20 may be positioned anywhere in the housing 15 containing the keyboard and adjacent to the display screen cover such that the camera cover 20 is between the keyboard and the display screen.

The apparatus 10a also includes a linkage mechanism 25 actuated by the camera cover 20. In an example, the linkage mechanism 25 may be an elongated bar that is rotatable across any suitable range of angles. However, the linkage mechanism 25 may comprise any suitable configuration, shape, or material. The linkage mechanism 25 may be electrically, optically, and/or mechanically actuated by the camera cover 20 such that movement or other type of actuation of the camera cover 20 may cause the linkage mechanism 25 to become actuated, i.e., rotate. The rotation of the linkage mechanism 25 may be controlled by any suitable mechanism such as a pin, etc. to ensure the linkage mechanism 25 remains in a predetermined range of motion. Furthermore, the linkage mechanism 25 may be arranged to comprise one or more components that operate in tandem in a gear-like manner to result in a suitable actuation, motion, or rotation, etc. In other examples, the linkage mechanism 25 may move in a translational motion in addition to, or as opposed to, a rotational motion.

The apparatus 10a further includes a camera 30 connected to the linkage mechanism 25. In an example, the camera 30 may be a webcam camera 30. Furthermore, the camera 30 may comprise any suitable arrangement of sub-components to house the electronics and optics to operate the camera 30. The camera 30 may capture images and process them alone or in combination with other processing components in the housing 15 or communicatively coupled to the housing 15.

In an example, the camera 30 is retained in the housing 15 during a fingerprint-sensing mode 35. According to an example, fingerprint-sensing mode 35 may correspond to a secured access or user authentication mode of operation such that the authentication of a user comprises a biometric scanning and identification of a user's fingerprint, which is not shown in FIG. 1. The camera 30 is used for authenticating the user in the fingerprint-sensing mode 35. Moreover, according to an example, in the fingerprint-sensing mode 35 the camera 30 is completely positioned within the housing 15 such that the camera 30 does not extend outside of the housing 15.

The camera 30 is to extend above the camera cover 20 in a media-capturing mode 40 via the linkage mechanism 25 based on a sliding movement of the camera cover 20. According to an example, the media-capturing mode 40 may correspond to a webcam use of the camera 30 such that the camera 30 may capture any type of media within its field of view. Some examples of the type of media captured by the camera 30 include images and videos. In an example, the camera cover 20 may slide by using a user's finger, a stylus, or any other engagement device or structure, or by automatic control by a signal transmitted by a controller or computer-implemented instructions, which causes the camera cover 20 to slide, which exposes an opening in the housing 15. When the camera cover 20 slides at a pre-set distance, the camera cover 20 contacts the linkage mechanism 25, which causes the linkage mechanism 25 to actuate; i.e., rotate. Thereafter, the rotation of the linkage mechanism 25 pushes the camera 30 upward and out of the opening in the housing 15. When the camera 30 extends out of the housing 15, the camera 30 extends over the housing 15 and the camera cover 20 and is now in a media-capturing mode 40.

According to an example, the fingerprint-sensing mode 35 and the media-capturing mode 40 may refer to the operation of the camera 30, and the fingerprint-sensing mode 35 and the media-capturing mode 40 may be mutually exclusive such that the camera 30 may operate in either the fingerprint-sensing mode 35 or the media-capturing mode 40 independently, but not both at the same time. The sliding action of the camera cover 20, which actuates the linkage mechanism 25 to push the camera 30 out of the housing 15, automatically transitions the mode of operation of the camera 30 from the fingerprint-sensing mode 35 to the media-capturing mode 40. In an example, upon sliding, the camera cover 20 directly contacts the linkage mechanism 25. In another example, upon sliding, the camera cover 20 may contact an intervening device or structure, which then engages the linkage mechanism 25 causing the linkage mechanism 25 to rotate. In another example, upon sliding, the camera cover 20 may transmit a signal, which causes the linkage mechanism 25 to rotate. According to an example, the signal may comprise any of an electrical, optical, and magnetic signal. In an example, the signal may be received by a controller or processor, which is not shown in FIG. 1, to trigger the actuation of the linkage mechanism 25.

FIG. 2, with reference to FIG. 1, illustrates that the apparatus 10a may comprise a light source 45 under the camera cover 20 to emit light 50. According to some examples, the light source 45 may comprise an infrared light-emitting diode (IR LED), a fluorescent lamp, or other type of component capable of emitting light 50. The light 50 may be emitted in a substantially uniform manner or may be directed non-uniformly, and may comprise any color or stream of colors, according to various examples. Moreover, according to an example, the light source 45 may selectively emit the light 50 such that only portions of the light source 45 emit light 50, or the light 50 may be emitted in phases and intensities from the light source 45 including in a strobe-like effect. The light 50 may be directed linearly away from the light source 45 and angularly, according to some examples. Furthermore, the intensity of the light 50 may be based on the power of the light source 45. According to an example, the light source 45 may be operatively connected to the linkage mechanism 25 such that when the linkage mechanism 25 moves or rotates, the light source 45 may similarly move to emit the light 50 in a suitable direction.

The apparatus 10a may also include a lens 47 to direct the light 50 towards the camera cover 20. In an example, the lens 47 may comprise a convex lens, a concave lens, or any type of suitable lens that may be used to focus or direct the light 50 emitted from the light source 45 and towards the camera cover 20. In an example, the lens 47 may be positioned under the camera cover 20. In another example, the lens 47 may be positioned adjacent to the camera cover 20 and in between the camera cover 20 and the light source 45. The lens 47 may be operatively connected to any of the camera cover 20 and the linkage mechanism 25 such that when any of the camera cover 20 and the linkage mechanism 25 move, the lens 47 may similarly move to direct the light 50 towards the camera cover 20.

Figure 3:
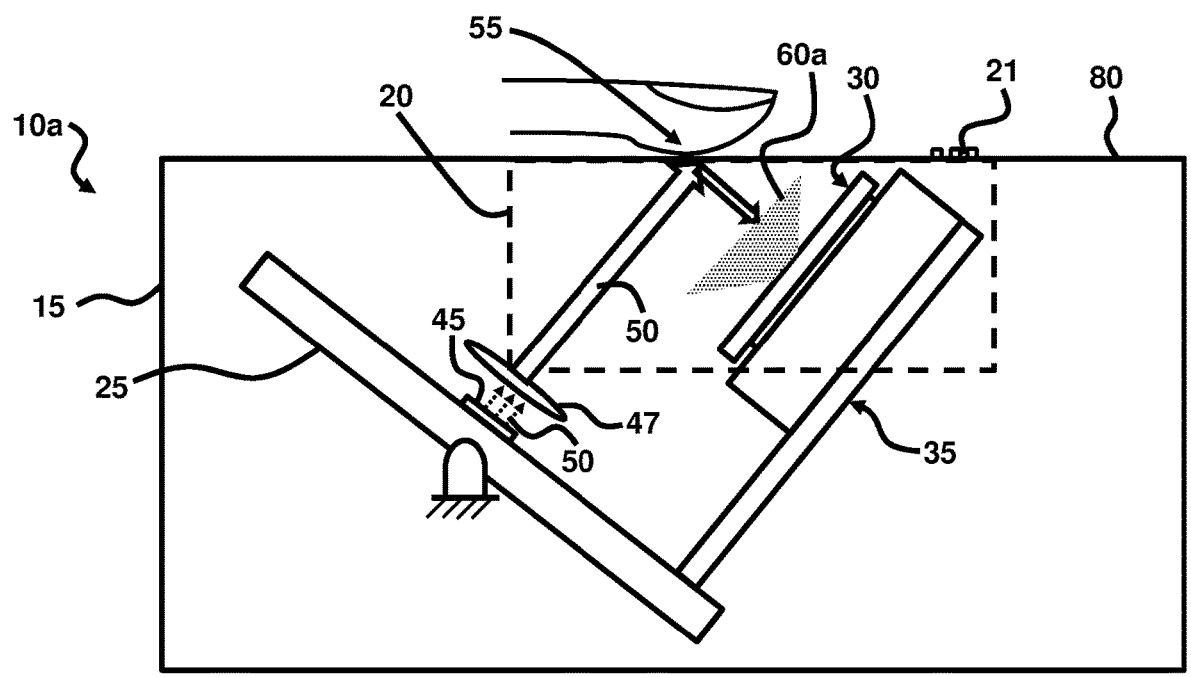
FIG. 3 is schematic diagram illustrating the apparatus of FIG. 2 with the light being directed towards a fingerprint over the camera cover, according to an example.

FIG. 3, with reference to FIGS. 1 and 2, illustrates that the camera cover 20 may be transparent to permit the light 50 to be directed towards a fingerprint 55 positioned over the camera cover 20. In this regard, the apparatus 10a may be set to the fingerprint-sensing mode 35. In an example, the camera cover 20 may comprise any type of transparent materials including glass, plastic, ceramic, or conductive materials. In an example, the camera cover 20 may have an open bottom portion to permit the light 50 to be directed, without obstruction, to the top and out of the camera cover 20. The light 50 may be directed to illuminate the fingerprint 55, which permits the camera 30 to capture an image 60a of the fingerprint 55. Accordingly, the camera 30 may be positioned under the camera cover 20 to capture the image 60a of the fingerprint 55. In an example, the camera cover 20 may be positioned to retain the camera 30 under the camera cover 20 prior to slidable movement of the camera cover 20. In another example, the camera cover 20 may comprise one or more raised bumps 21 that extend above the camera cover 20 and the upper surface 80 of the housing 15 to provide a grip for a user to slide the camera cover 20.

Figure 4A:
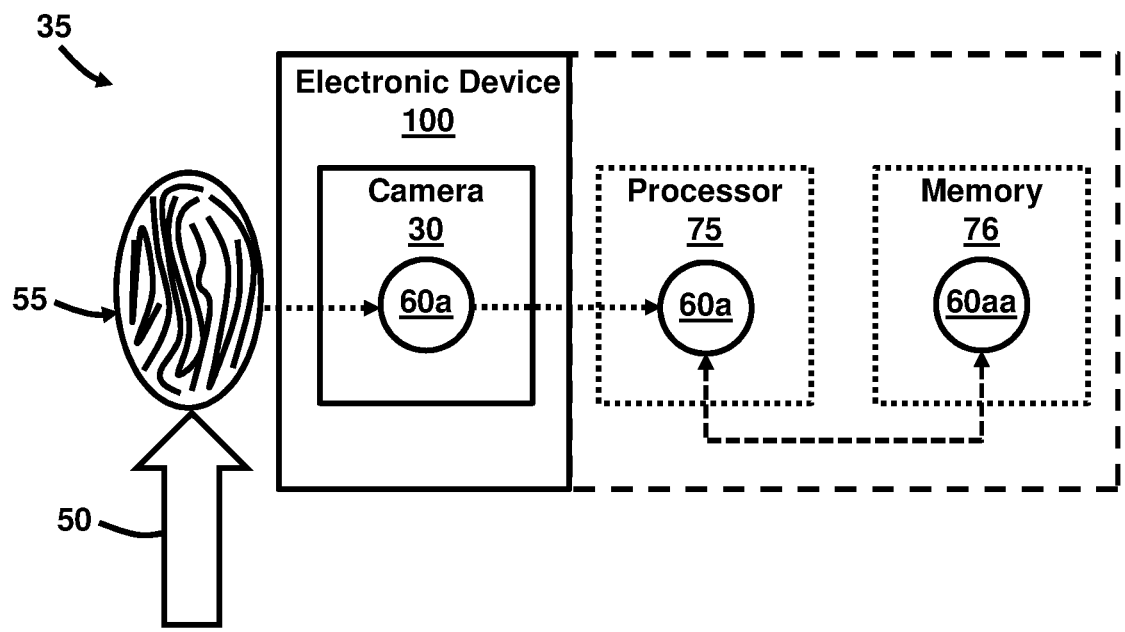
FIG. 4A is a block diagram illustrating a fingerprint-sensing mode using image processing to perform fingerprint authentication, according to an example.

Upon capturing the image 60a of the fingerprint 55, the camera 30 may transmit the image 60a to a processor 75, which is shown in FIG. 4A, with reference to FIGS. 1 through 3, to compare the image 60a with a previously-stored image 60aa retrieved from memory 76. Accordingly, in the fingerprint-sensing mode 35 depicted in FIG. 4A, the light 50 may illuminate the fingerprint 55 to allow the camera 30 to more easily capture the image 60a of the fingerprint 55. If the processor 75 determines that the image 60a matches the previously-stored image 60aa, then the processor 75 may determine that the user associated with the fingerprint 55 is authenticated to use the electronic device 100. According to some examples, the processor 75 and memory 76 may be part of the electronic device 100 or the processor 75 and memory 76 may be remotely and communicatively linked to the electronic device 100 but are not necessarily part of the electronic device 100.

Figure 4B:
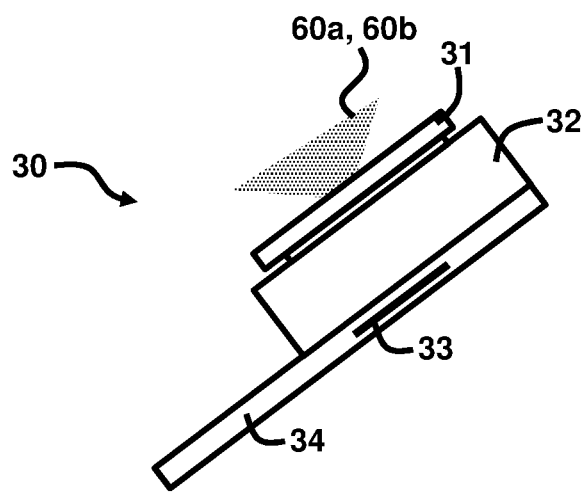
FIG. 4B is cross-sectional schematic diagram illustrating the camera of the apparatus of FIG. 1, according to an example.

FIG. 4B, with reference to FIGS. 1 through 4A, illustrates an isolated view of the camera 30. In an example, the camera 30 may comprise a lens 31 to capture images 60a, 60b, a lens holder 32 to retain the lens 31 in place, and a sensor 33 arranged on a printed circuit board 34 to detect the images 60a, 60b. Moreover, the camera 30 may have any suitable field of view in order to capture the images 60a, 60b. For example, the camera 30 may have a field of view between approximately 80°-120°, although other ranges are possible.

FIG. 5, with reference to FIGS. 1 through 4B, illustrates an apparatus 10b comprising a touch sensor 165. According to an example, the touch sensor 165 may comprise any suitable configuration, shape, or material. The touch sensor 165 may comprise transparent materials, according to an example. In one example, the touch sensor 165 may be resilient such that it may be depressed by the application of a force; i.e., from a user's finger, etc., and may return to its original position upon removal of the force. In an example, the touch sensor 165 may be hollow to house various components therein. In another example, the bottom portion of the touch sensor 165 may be open and may connect to another component or components. According to various examples, the touch sensor 165 may be arranged at any suitable position on an electronic device, which is not shown in FIG. 5. In one example, the touch sensor 165 may be positioned adjacent to the keyboard, which is not shown in FIG. 5, of an electronic device such as a laptop, notebook, or tablet computer, etc. More particularly, the touch sensor 165 may be positioned anywhere on the electronic device such as adjacent to the keyboard and adjacent to the display screen cover such that the touch sensor 165 is between the keyboard and the display screen. In the example of the apparatus 10b of FIG. 5, the touch sensor 165 may comprise a single component structure or may be comprised of multiple sub-component structures.

The apparatus 10b may further comprise a linkage mechanism 125 actuated by the touch sensor 165. In an example, the linkage mechanism 125 may be an elongated bar that is rotatable across any suitable range of angles. However, the linkage mechanism 125 may comprise any suitable configuration, shape, or material. The linkage mechanism 125 may be electrically, optically, and/or mechanically actuated by the touch sensor 165 such that movement or other type of actuation of the touch sensor 165 may cause the linkage mechanism 125 to become actuated, i.e., rotate. The rotation of the linkage mechanism 125 may be controlled by any suitable mechanism such as a pin, etc. to ensure the linkage mechanism 125 remains in a predetermined range of motion. Furthermore, the linkage mechanism 125 may be arranged to comprise one or more components that operate in tandem in a gear-like manner to result in a suitable actuation, motion, or rotation, etc. In other examples, the linkage mechanism 125 may move in a translational motion in addition to, or as opposed to, a rotational motion.

The apparatus 10b may also include a camera 130 connected to the linkage mechanism 125. In an example, the camera 130 may be a webcam camera 130. Furthermore, the camera 130 may comprise any suitable arrangement of sub-components to house the electronics and optics to operate the camera 130 such as those describes with reference to FIG. 4B. Moreover, the camera 130 may have any suitable field of view. For example, the camera 130 may have a field of view between approximately 80°-120°, although other ranges are possible. The camera 130 may capture images and process them alone or in combination with other processing components.

According to an example, the camera 130 is to move from a first position $P_1$ below the touch sensor 165 to a second position $P_2$ above the touch sensor 165 via the linkage mechanism 125 based on a sliding movement of the touch sensor 165. According to an example, the first position $P_1$ may correspond to the fingerprint-sensing mode 35 described above with respect to apparatus 10a, and the second position $P_2$ may correspond to the media-capturing mode 40 described above with respect to apparatus 10a. Moreover, the first position $P_1$ and the second position $P_2$ may refer to the position(s) of the camera 130 with respect to the touch sensor 165, and the first position $P_1$ and the second position $P_2$ may be mutually exclusive such that the camera 130 may operate in either the first position $P_1$ or the second position $P_2$ independently, but not both at the same time. The sliding action of the touch sensor 165, which actuates the linkage mechanism 125 to push the camera 130 above the touch sensor 165, automatically transitions the position of the camera 130 from the first position $P_1$ to the second position $P_2$. In an example, upon sliding, the touch sensor 165 directly contacts the linkage mechanism 125. In another example, upon sliding, the touch sensor 165 may contact an intervening device or structure, which then engages the linkage mechanism 125 causing the linkage mechanism 125 to rotate. In another example, upon sliding, the touch sensor 165 may transmit a signal, which causes the linkage mechanism 125 to rotate. According to an example, the signal may comprise any of an electrical, optical, and magnetic signal. In an example, the signal may be received by a controller or processor, which is not shown in FIG. 5, to trigger the actuation of the linkage mechanism 125.

FIG. 6, with reference to FIGS. 1 through 5, illustrates that the apparatus 10b may be contained in a housing 115. In an example, the housing 115 may be a panel, bezel, cover of an electronic device 100, shown in FIG. 4, such as a laptop, tablet, or notebook computer. The housing 115 may comprise any suitable configuration, shape, or material suitable for containing the electronics and components of the electronic device. Moreover, the housing 115 shown in the figures may comprise any suitable portion of the panel, bezel, cover, etc. of an electronic device 100, and in an example, the housing 115 may be the keyboard cover or panel of a laptop, tablet, or notebook computer, or a communication device. In another example, the touch sensor 165 may comprise one or more raised bumps 121 that extend above the touch sensor 165 and the upper surface 180 of the housing 115 to provide a grip for a user to slide the touch sensor 165. Upon sliding the touch sensor 165, an opening 185 is created in the upper surface 180 of the housing 115 to permit the camera 130 to extend therethrough and above the touch sensor 165.

According to an example, the camera 130 may capture images 160b at a higher resolution when the camera 130 is at the second position $P_2$ than images 160a captured when the camera 130 is at the first position $P_1$. In this regard, the camera 130 may capture images 160b at a higher resolution when the camera 130 is set to the media-capturing mode 40 compared to when the camera 130 is set to the fingerprint-sensing mode 35. In an example, the images 160b may be captured in a high-definition (HD) resolution or video graphics array (VGA) resolution; i.e., at 1080p (pixel) resolution, although other resolutions are possible. In an example, the images 160a may be captured in a quarter video graphics array (QVGA) resolution; i.e., at 720p resolution, although other resolutions are possible.

FIG. 7, with reference to FIGS. 1 through 6, illustrates that the apparatus 10b may comprise a moveable transparent camera cover 120 operatively connected to the touch sensor 165 to engage the linkage mechanism 125 to rotate upon slidable movement of the touch sensor 165. In an example, the transparent camera cover 120 may comprise any type of transparent materials including glass, plastic, ceramic, or conductive materials. The transparent camera cover 120 may be integrated with the touch sensor 165 in one example, or alternatively, the transparent camera cover 120 may be a separate structure from the touch sensor 165 such that the transparent camera cover 120 and the touch sensor 165 are connected to each other such that any movement of the touch sensor 165 results in a corresponding and similar movement of the transparent camera cover 120.

In an example, the transparent camera cover 120 may have an open bottom portion. Accordingly, the camera 130 may be positioned under the camera cover 120 to capture an image 160a. In an example, the camera cover 120 may be positioned to retain the camera 130 under the camera cover 120 prior to slidable movement of the camera cover 120. In another example, the camera cover 120 may comprise one or more raised bumps 121 that extend above the camera cover 120 and the upper surface 180 of the housing 115 to provide a grip for a user to slide the camera cover 120.

FIG. 8, with reference to FIGS. 1 through 7, illustrates that the apparatus 10b may comprise a bumper mechanism 170 operatively connected to the camera 130. According to an example, the bumper mechanism 170 may buffer the camera 130 from being damaged due to contact from another component, surface, etc. For example, the apparatus 10b may be part of a housing 115 of a laptop computer and upon the camera 130 being raised above the housing 115, if the user closes the laptop computer; i.e., collapses the display screen bezel against the housing 115 of the keyboard section, then the bumper mechanism 170 may receive the impact of the display screen bezel rather than the camera 130, which protects the camera 130 from being damaged. In an example, the bumper mechanism 170 may comprise any suitable material such as rubber, neoprene, silicone, durable plastics, among other materials capable of absorbing impacts of applied forces and shielding the camera 130 from receiving those forces.

Figure 9:
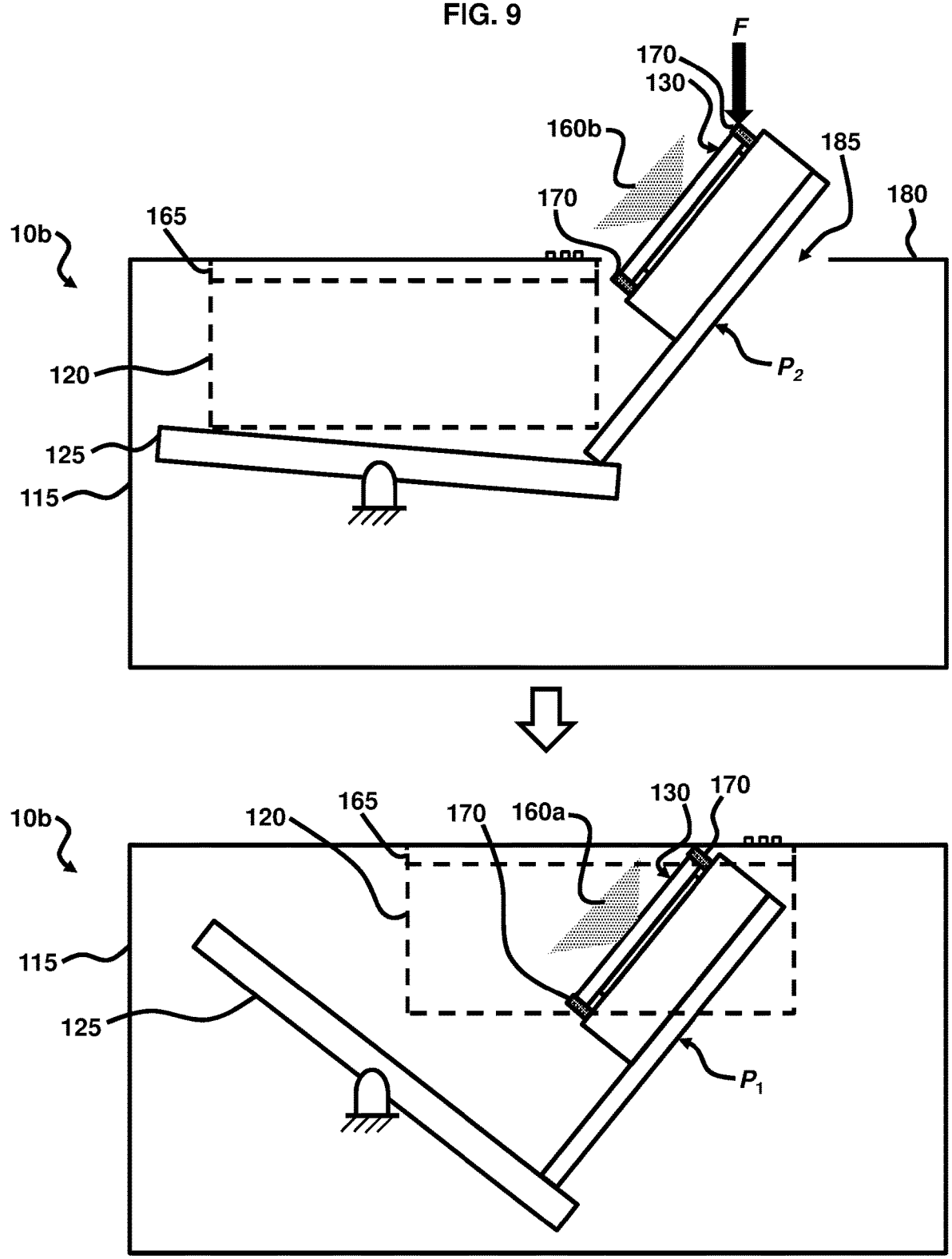
FIG. 9 is a cross-sectional schematic diagram illustrating the transmission of light at various angles resulting in a visually white light being displayed by the apparatus of FIG. 5, according to an example.

FIG. 9, with reference to FIGS. 1 through 8, illustrates that the camera 130 may be retractable from the second position $P_2$ to the first position $P_1$ to cause the linkage mechanism 125 to become actuated to cause the touch sensor 165 to slide over the camera 130. In an example, a force F may be applied on the camera 130 to push the camera 130 through the opening 185 of the upper surface 180 of the housing 115, and back into the housing 115 under the touch sensor 165 and transparent camera cover 120. The amount of force F necessary to retract the camera 130 into the housing 115 is not restricted to any particular amount of force, and may be based on the size of the camera 130. In an example, the force F may be received by the bumper mechanism 170 to protect the camera 130 from damage. Upon retraction of the camera 130 into the housing 115, the linkage mechanism 125 may move or rotate in an opposite direction from its original movement or rotation when it was set to push the camera 130 out of the housing 115. The counter-movement or counter-rotation of the linkage mechanism 125 pushes the transparent camera cover 120 and touch sensor 165 over the opening 185 in the housing 115 to re-set the transparent camera cover 120 and touch sensor 165 back to their original positions; e.g., the first position $P_1$ of the camera 130.

FIG. 10, with reference to FIGS. 1 through 9, illustrates an apparatus 10c comprising a housing 215. In an example, the housing 215 may be a panel, bezel, cover of an electronic device, which is not shown in FIG. 1, such as a laptop, tablet, or notebook computer. The housing 215 may comprise any suitable configuration, shape, or material suitable for containing the electronics and components of the electronic device. Moreover, the housing 215 shown in the figures may comprise any suitable portion of the panel, bezel, cover, etc. of an electronic device, and in an example, the housing 215 may be the keyboard cover or panel of a laptop, tablet, or notebook computer, or a communication device.

The apparatus 10c may further comprise a touch sensor 265 positioned on the housing 215 to detect a presence of a fingerprint 255 associated with an authentication operation A. The fingerprint 255 may be associated with a user seeking to gain operational access of an electronic device. According to an example, the touch sensor 265 may comprise any suitable configuration, shape, or material. The touch sensor 265 may comprise transparent materials, according to an example. In one example, the touch sensor 265 may be resilient such that it may be depressed by the application of a force; i.e., from a user's finger, etc., and may return to its original position upon removal of the force. In an example, the touch sensor 265 may be hollow to house various components therein. In another example, the bottom portion of the touch sensor 265 may be open and may connect to another component or components. According to various examples, the touch sensor 265 may be arranged at any suitable position on an electronic device, which is not shown in FIG. 10. In one example, the touch sensor 265 may be positioned adjacent to the keyboard, which is not shown in FIG. 10, of an electronic device such as a laptop, notebook, or tablet computer, etc. More particularly, the touch sensor 265 may be positioned anywhere on the electronic device such as adjacent to the keyboard and adjacent to the display screen cover such that the touch sensor 265 is between the keyboard and the display screen. In the example of the apparatus 10c of FIG. 10, the touch sensor 265 may comprise a single component structure or may be comprised of multiple sub-component structures.

According to an example, the authentication operation A may be associated with the fingerprint-sensing mode 235 further described below. Furthermore, according to an example, the authentication operation A may be associated with the first position $P_1$ described above with reference to apparatus 10b. The authentication operation A may allow a user to access to an electronic device using biometric analysis of the user of the electronic device.

The apparatus 10c may comprise a linkage mechanism 225 positioned within the housing 215 and below the touch sensor 265. According to an example, the linkage mechanism 225 is to rotate upon slidable movement of the touch sensor 265. In an example, the linkage mechanism 225 may be an elongated bar that is rotatable across any suitable range of angles. However, the linkage mechanism 225 may comprise any suitable configuration, shape, or material. The linkage mechanism 225 may be electrically, optically, and/or mechanically actuated by the touch sensor 265 such that movement or other type of actuation of the touch sensor 265 may cause the linkage mechanism 225 to become actuated, i.e., rotate. The rotation of the linkage mechanism 225 may be controlled by any suitable mechanism such as a pin, etc. to ensure the linkage mechanism 225 remains in a predetermined range of motion. Furthermore, the linkage mechanism 225 may be arranged to comprise one or more components that operate in tandem in a gear-like manner to result in a suitable actuation, motion, or rotation, etc. In other examples, the linkage mechanism 225 may move in a translational motion in addition to, or as opposed to, a rotational motion.

The apparatus 10c may comprise a camera 230 positioned in the housing 215 and operatively connected to the linkage mechanism 225 to capture an image 260a of the fingerprint 255. In an example, the camera 230 may be a webcam camera 230. Furthermore, the camera 230 may comprise any suitable arrangement of sub-components to house the electronics and optics to operate the camera 230 such as those describes with reference to FIG. 4B. Moreover, the camera 230 may have any suitable field of view. For example, the camera 230 may have a field of view between approximately 80°-120°, although other ranges are possible. The camera 230 may capture images 260a and process them alone or in combination with other processing components.

The apparatus 10c may further comprise a processor 75 to perform the authentication operation A using the image 260a of the fingerprint 255, according to an example. In some examples, the processor 75 described herein and/or illustrated in the figures may include hardware-enabled modules and may include a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The modules that include electronic circuits may process computer logic instructions capable of providing digital and/or analog signals for performing various functions as described herein. The various functions can further be physically saved as any of data structures, data paths, data objects, data object models, object files, and database components. For example, the data objects could include a digital packet of structured data. The data structures could include any of an array, tuple, map, union, variant, set, graph, tree, node, and an object, which may be stored and retrieved by computer memory and may be managed by processors, compilers, and other computer hardware components. The data paths may be part of a computer CPU that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations (e.g., arithmetic, logical, rotate, etc.), and complex operations (e.g., using single clock calculations, sequential calculations, iterative calculations, etc.). The data objects may be physical locations in computer memory and can be a variable data object, a data structure, or a function. In an example of a relational database, the data objects can be set as a table or column. Other implementations include specialized objects, distributed objects, object-oriented programming objects, and semantic web objects, for example. Furthermore, the data object models can be set as an application programming interface for creating HyperText Markup Language (HTML) and Extensible Markup Language (XML) electronic documents. The models can be further set as any of a tree, graph, container, list, map, queue, set, stack, and variations thereof, according to various examples. The data object files may be created by compilers and assemblers and may contain generated binary code and data for a source file. The database components can include any of tables, indexes, views, stored procedures, and triggers.

In some examples, the processor 75 may comprise a central processing unit (CPU) of the electronic device 100 or an associated computing device, not shown. In other examples the processor 75 may be a discrete component independent of other processing components in the electronic device 100. In other examples, the processor 75 may be a microprocessor, microcontroller, hardware engine, hardware pipeline, and/or other hardware-enabled device suitable for receiving, processing, operating, and performing various functions required by the electronic device 100. The processor 75 may be provided in the electronic device 100, coupled to the electronic device 100, or communicatively linked to the electronic device 100 from a remote networked location, according to various examples.

In an example, the camera 230 is to slide out of the housing 215 upon rotation of the linkage mechanism 225 to perform a media-capturing operation B. According to an example, the camera 230 is to move from the authentication operation A below the touch sensor 265 to the media-capturing operation B above the touch sensor 265 via the linkage mechanism 225 based on a sliding movement of the touch sensor 265. According to an example, the authentication operation A may correspond to the fingerprint-sensing mode 235 described above, and the media-capturing operation B may correspond to a webcam use of the camera 230 such that the camera 230 may capture any type of media within its field of view. Some examples of the type of media captured by the camera 230 include images and videos. In an example, the touch sensor 265 may slide by using a user's finger, a stylus, or any other engagement device or structure, or by automatic control by a signal transmitted by a controller or computer-implemented instructions, which causes the touch sensor 265 to slide, which exposes an opening in the housing 215. When the touch sensor 265 slides at a pre-set distance, the touch sensor 265 operatively contacts the linkage mechanism 225, which causes the linkage mechanism 225 to actuate; i.e., rotate. Thereafter, the rotation of the linkage mechanism 225 pushes the camera 230 upward and out of the opening in the housing 215. When the camera 230 extends out of the housing 215, the camera 230 extends over the housing 215 and the touch sensor 265 and is now in a media-capturing operation B.

Moreover, the authentication operation A and the media-capturing operation B may refer to the operation of the processor 75 as dictated by the position of the linkage mechanism 225, camera 230, and/or touch sensor 265, and the authentication operation A and the media-capturing operation B may be mutually exclusive such that the processor 75 may operate in either the authentication operation A or the media-capturing operation B independently, but not both at the same time. Furthermore, the authentication operation A and the media-capturing operation B may be mutually exclusive such that the camera 230 may operate in either the authentication operation A or the media-capturing operation B independently, but not both at the same time.

The sliding action of the touch sensor 265, which actuates the linkage mechanism 225 to push the camera 230 above the touch sensor 265, automatically transitions the position of the camera 230 from the authentication operation A to the media-capturing operation B. In an example, upon sliding, the touch sensor 265 directly contacts the linkage mechanism 225. In another example, upon sliding, the touch sensor 265 may contact an intervening device or structure, which then engages the linkage mechanism 225 causing the linkage mechanism 225 to rotate. In another example, upon sliding, the touch sensor 265 may transmit a signal, which causes the linkage mechanism 225 to rotate. According to an example, the signal may comprise any of an electrical, optical, and magnetic signal. In an example, the signal may be received by a controller or processor, which is not shown in FIG. 10, to trigger the actuation of the linkage mechanism 225.

Upon capturing the image 260a of the fingerprint 255, the camera 230 may transmit the image 260a to the processor 75 to compare the image 260a with a previously-stored image; e.g., previously-stored image 60aa shown in FIG. 4. If the processor 75 determines that the image 260a matches the previously-stored image 60aa, then the processor 75 may determine that the user associated with the fingerprint 255 is authenticated to use an electronic device associated with the housing 215. According to some examples, the processor 75 may be part of the housing 215 or the processor 75 may be remotely and communicatively linked to the housing 215 but are not necessarily part of the housing 215.

FIG. 11, with reference to FIGS. 1 through 10, illustrates that the camera 230 may operate in a fingerprint-sensing mode 235 upon being positioned in the housing 215 and below the touch sensor 265. According to an example, the fingerprint-sensing mode 235 may correspond to the authentication operation A and the first position $P_1$ described above. Moreover, the camera 230 is to operate in a media-capturing mode 240 upon being positioned to slide out of the housing 215 and above a surface 280 of the housing 215. According to an example, the media-capturing mode 240 may correspond to the media-capturing operation B and the second position $P_2$ described above.

Figure 12:
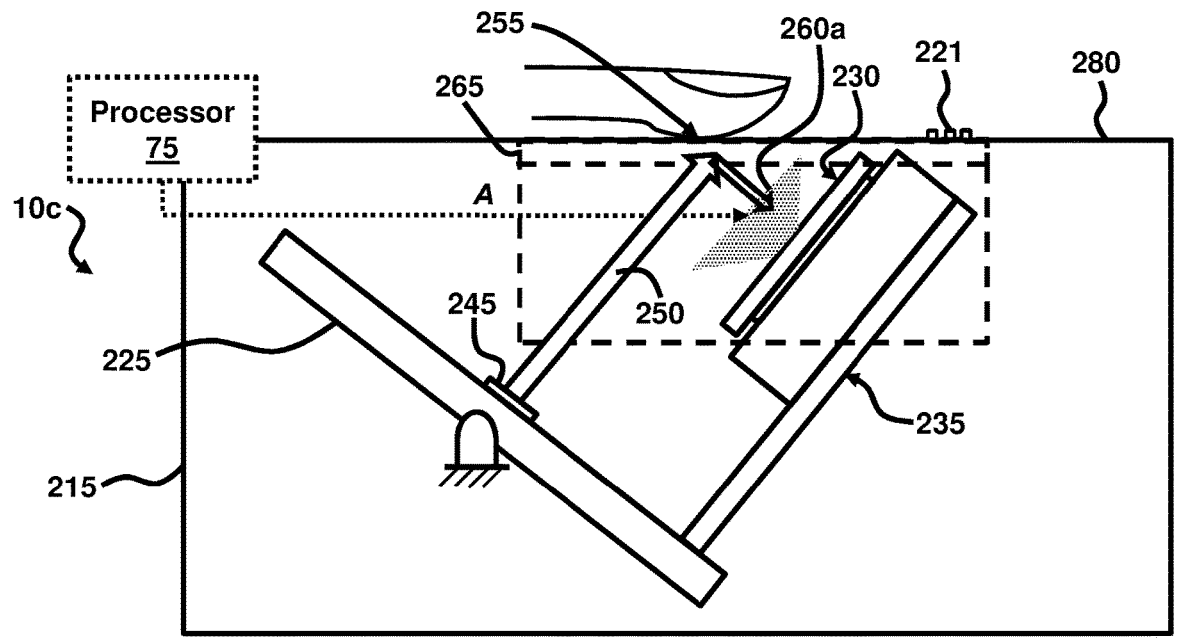
FIG. 12 is a cross-sectional schematic diagram illustrating the apparatus of FIG. 10 with a light source to direct light to enhance fingerprint illumination, according to an example.

FIG. 12, with reference to FIGS. 1 through 11, illustrates that the apparatus 10c may comprise a light source 245 connected to the linkage mechanism 225 and positioned to direct light 250 towards the touch sensor 265 to enhance an illumination of a detected fingerprint 255 on the touch sensor 265 to permit the camera 230 to capture the image 260a of the fingerprint 255 in the fingerprint-sensing mode 235. According to some examples, the light source 245 may comprise an IR LED, a fluorescent lamp, or other type of component capable of emitting light 250. The light 250 may be emitted in a substantially uniform manner or may be directed non-uniformly, and may comprise any color or stream of colors, according to various examples. Moreover, according to an example, the light source 245 may selectively emit the light 250 such that only portions of the light source 245 emit light 250, or the light 250 may be emitted in phases and intensities from the light source 245 including in a strobe-like effect. The light 250 may be directed linearly away from the light source 245 and angularly, according to some examples. Furthermore, the intensity of the light 250 may be based on the power of the light source 245. According to an example, the light source 245 may be operatively connected to the linkage mechanism 225 such that when the linkage mechanism 225 moves or rotates, the light source 245 may similarly move to emit the light 250 in a suitable direction.

The touch sensor 265 may be transparent to permit the light 250 to be directed towards a fingerprint 255 positioned over the touch sensor 265. In this regard, the apparatus 10c may be set to the authentication operation A and the fingerprint-sensing mode 235. In an example, the touch sensor 265 may comprise any type of transparent materials including glass, plastic, ceramic, or conductive materials. In an example, the touch sensor 265 may have an open bottom portion to permit the light 250 to be directed, without obstruction, to the top and out of the touch sensor 265. The light 250 may be directed to illuminate the fingerprint 255, which permits the camera 230 to capture an image 260a of the fingerprint 255. Accordingly, the camera 230 may be positioned under the touch sensor 265 to capture the image 260a of the fingerprint 255. In an example, the touch sensor 265 may be positioned to retain the camera 230 under the touch sensor 265 prior to slidable movement of the touch sensor 265. In another example, the touch sensor 265 may comprise one or more raised bumps 221 that extend above the touch sensor 265 and the upper surface 280 of the housing 215 to provide a grip for a user to slide the touch sensor 265.

Figure 13:
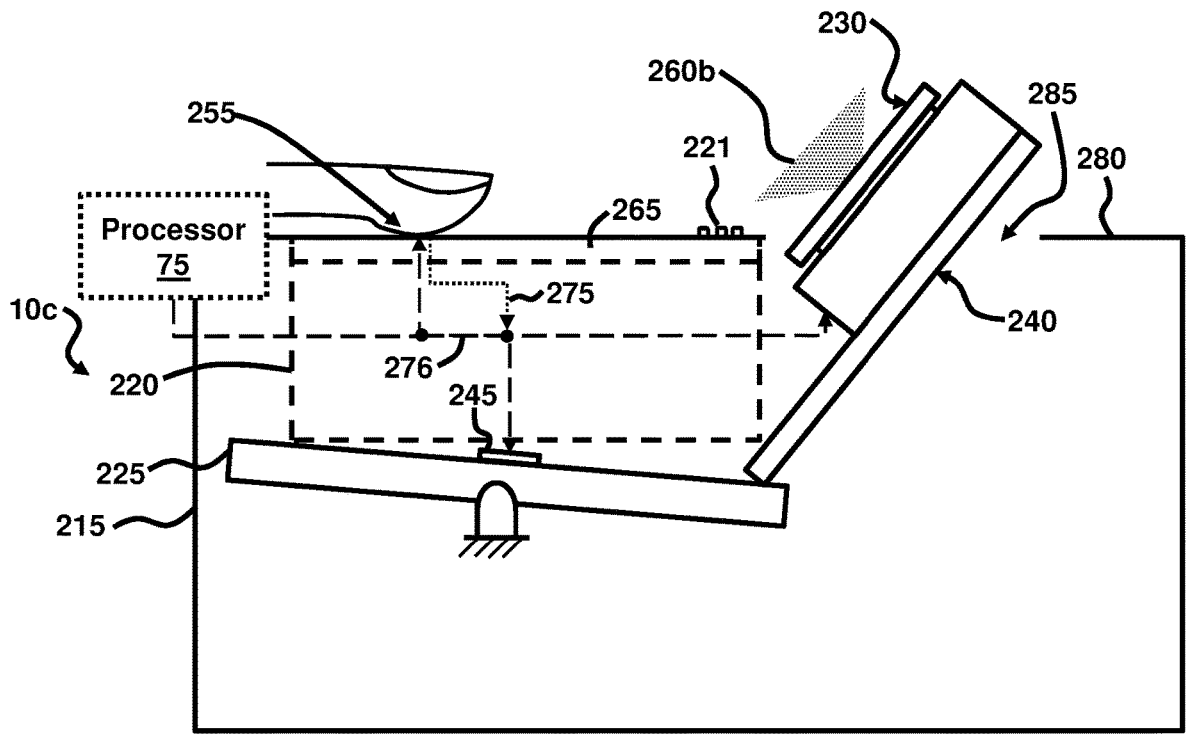
FIG. 13 is a cross-sectional schematic diagram illustrating the activation and deactivation of the light source and camera of the apparatus of FIG. 10, according to an example.

Upon the touch sensor 265 detecting the presence of the fingerprint 255, the touch sensor 265 may activate operation of the light source 245 and the camera 230 to allow the camera 230 to capture the image 260a. In an example, the touch sensor 265 may transmit a signal 275 via the processor 75 to the light source 245 to activate the light source 245. The signal 275 may comprise any of an electrical, optical, and magnetic signal. Furthermore, in an example, the touch sensor 265 may be electrically, optically, and/or magnetically coupled to the processor 75, linkage mechanism 225, and/or the light source 245. Upon the processor 75 identifying the fingerprint 255, the processor 75 may deactivate operation of the light source 245 and the camera 230. In this regard, the processor 75 may transmit a signal 276 to the light source 245 and the camera 230. The signal 276 may comprise any of an electrical, optical, and magnetic signal. Furthermore, in an example, the processor 75 may be electrically, optically, and/or magnetically coupled to the linkage mechanism 225, camera 230, the light source 245, and/or the touch sensor 265. In an example, the deactivation of the light source 245 by the processor 75 allows the apparatus 10c to enter into a power-savings mode since the light source 245 is not active. FIG. 13, with reference to FIGS. 1 through 12, illustrates that once the deactivation of the light source 245 occurs, and the touch sensor 265 and camera cover 220 slide to actuate the linkage mechanism 225, then the camera 230 extends through the opening 285 in the upper surface 280 of the housing 215 to permit the camera 230 to capture images 260b in a media-capturing mode 240.

Figure 14:
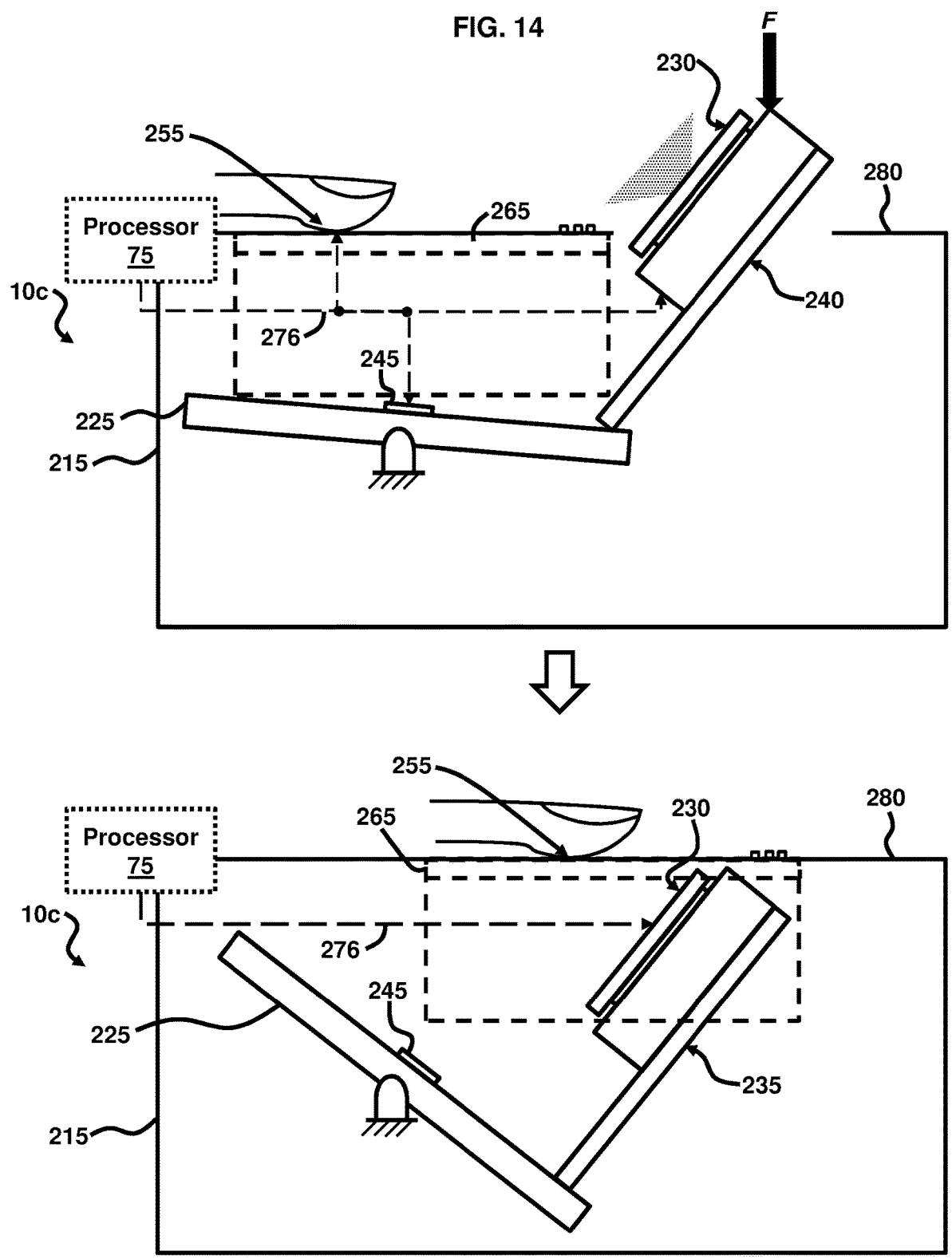
FIG. 14 is a cross-sectional schematic diagram illustrating the activation and deactivation of the light source and camera by a processor of the apparatus of FIG. 10, according to an example.

FIG. 14, with reference to FIGS. 1 through 13, illustrates that upon the camera 230 sliding out of the housing 215, the processor 75 may activate operation of the camera 230. In this regard, the processor 75 may transmit a signal 276 to the camera 230. The signal 276 may comprise any of an electrical, optical, and magnetic signal. Furthermore, in an example, the processor 75 may be electrically, optically, and/or magnetically coupled to the camera 230. Accordingly, once the camera 230 slides out of the housing 215, the camera 230 may be set to the media-capturing mode 240. Moreover, the retraction of the camera 230 back into the housing 215 may cause the processor 75 to deactivate operation of the camera 230 via the signal 276. The retraction may occur by applying a force F upon the camera 230 to push/retract the camera 230 into the housing 215. Accordingly, once the camera 230 retracts back into the housing 215, the camera 230 may be set to the fingerprint-sensing mode 235.

Figure 15:
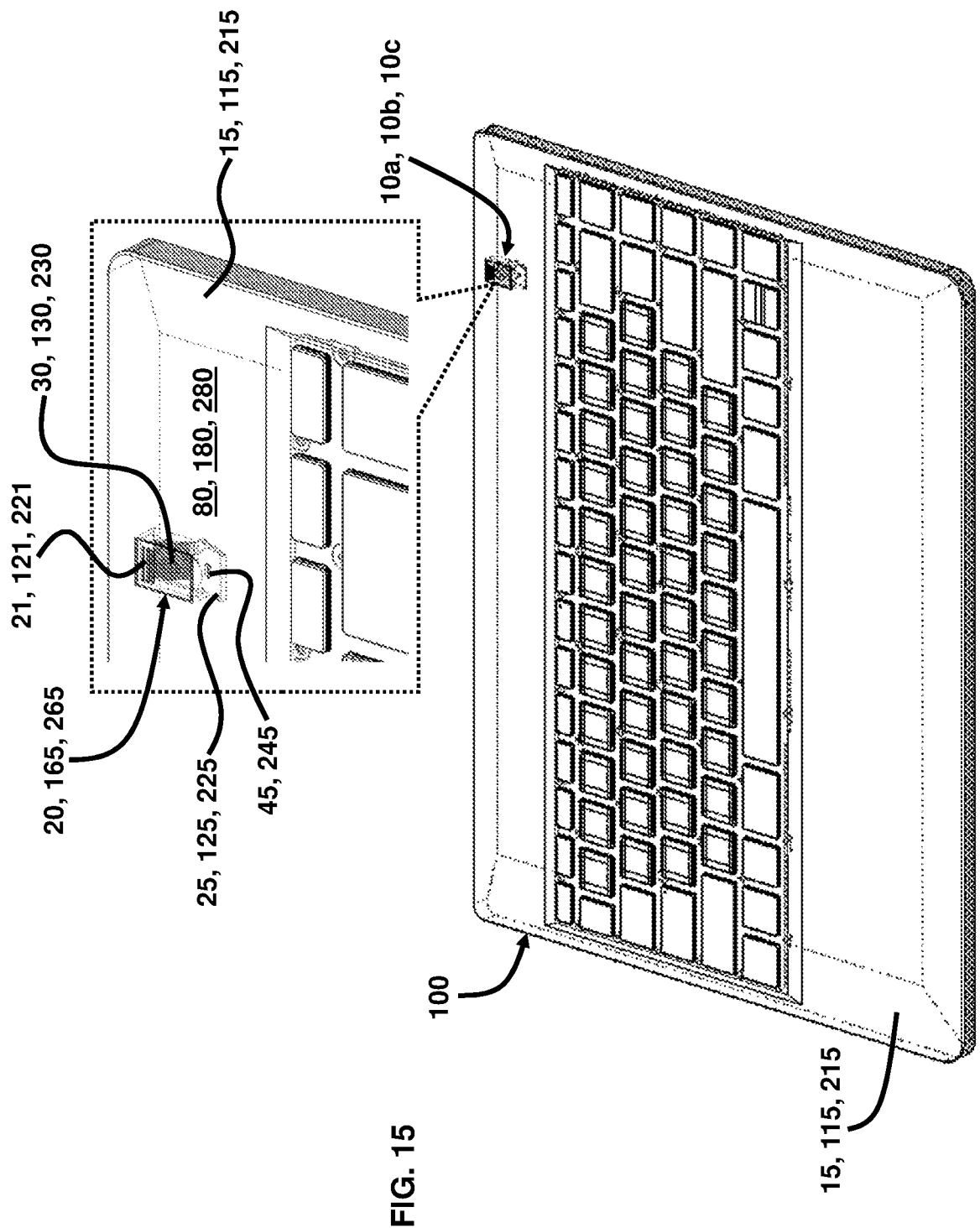
FIG. 15 is a schematic diagram illustrating an electronic device containing any of the apparatuses of FIG. 1, 5, or 10, according to an example.

FIG. 15, with reference to FIGS. 1 through 14, illustrates an electronic device 100 containing any of the apparatuses 10a, 10b, or 10c according to an example. The apparatuses 10a, 10b, or 10c are shown as being positioned in the respective housing 15, 115, 215. However, the positioning of the apparatuses 10a, 10b, or 10c in the housing 15, 115, 215, respectively, illustrated in FIG. 15 is merely an example, and as such, the apparatuses 10a, 10b, or 10c may be arranged at any suitable position in the housing 15, 115, 215, respectively. The camera cover 20 and touch sensor 165, 265 are illustrated as being positioned substantially planar to the upper surface 80, 180, 280 of housing 15, 115, 215, respectively. However, the camera cover 20 and touch sensor 165, 265 may be positioned above or below the upper surface 80, 180, 280 of the housing 15, 115, 215 according to other examples. The raised bumps 21, 121, 221 on the camera cover 20 and touch sensor 165, 265 are also depicted in FIG. 15. The camera 30, 130, 230 and linkage mechanism 25, 125, 225 with an operatively connected light source 45, 245 are shown in phantom lines below the camera cover 20 and touch sensor 165, 265 and within the housing 15, 115, 215.

FIG. 16A, with reference to FIGS. 1 through 15, illustrates a fingerprint-sensing mode 35, 235 such that the camera cover 20 and touch sensor 165, 265 have not been slid, and thus the camera 30, 130, 230 is in the first position $P_1$ and is contained within the housing 15, 115, 215 of the electronic device 100, according to an example. As such, the linkage mechanism 25, 125, 225 is not engaged or actuated by the camera cover 20, 120, 220. FIG. 16B, with reference to FIGS. 1 through 16A, illustrates a media-capturing mode 40, 240 such that the camera cover 20 and touch sensor 165, 265 have been slid, and thus the camera 30, 130, 230 is in the second position $P_2$ and is extending outside and above the housing 15, 115, 215 of the electronic device 100, according to an example. As such, the linkage mechanism 25, 125, 225 is engaged or actuated by the camera cover 20, 120, 220 thereby pushing the camera 30, 130, 230 out of the housing 15, 115, 215 of the electronic device 100.

The various examples described above allow for an integrated fingerprint and webcam multi-function apparatus 10a, 10b, 10c. When contained within the housing 15, 115, 215, the camera 30, 130, 230 may be in a short focus mode to capture images 60a, 160a, 260a approximately 5 mm away such as a fingerprint 55, 255 pressed against the camera cover 20 or touch sensor 165, 265. Moreover, when extending out of the housing 15, 115, 215, the camera 30, 130, 230 may be in an auto-focus mode to capture images 60b, 160b, 260b as a webcam.

The present disclosure has been shown and described with reference to the foregoing implementations. Although specific examples have been illustrated and described herein it is manifestly intended that other forms, details, and examples may be made without departing from the scope of the disclosure that is defined in the following claims.

What is claimed is:

1. An apparatus comprising:
a housing;
a camera cover connected to the housing;
a linkage mechanism actuated by the camera cover;
a camera connected to the linkage mechanism, wherein the camera is retained in the housing during a fingerprint-sensing mode, and wherein the camera is to extend above the camera cover in a media-capturing mode via the linkage mechanism based on a sliding movement of the camera cover;
a light source under the camera cover to emit light; and
a lens to direct the light towards the camera cover,
wherein the camera cover is transparent to permit the light to be directed towards a fingerprint positioned over the camera cover.

2. The apparatus of claim 1, wherein the camera is positioned under the camera cover to capture an image of the fingerprint.

3. The apparatus of claim 1, wherein the camera cover is positioned to retain the camera under the camera cover prior to slidable movement of the camera cover.

4. The apparatus of claim 1, wherein the light source is to move when the linkage mechanism moves.

5. The apparatus of claim 1, wherein the lens is positioned under the camera cover.

6. The apparatus of claim 1, wherein the lens is positioned adjacent to the camera cover.

7. The apparatus of claim 1, wherein the lens is positioned in between the camera cover and the light source.

8. The apparatus of claim 1, wherein the lens is to move when the camera cover moves.

9. The apparatus of claim 1, wherein the lens is to move when the linkage mechanism moves.

10. The apparatus of claim 1, wherein the camera cover comprises a raised bump extending above the camera cover and an upper surface of the housing.

11. An apparatus comprising:
a touch sensor;
a linkage mechanism actuated by the touch sensor; and
a camera connected to the linkage mechanism, wherein the camera is to move from a first position below the touch sensor to a second position above the touch sensor via the linkage mechanism based on a sliding movement of the touch sensor.

12. The apparatus of claim 11, wherein the camera is to capture images at a higher resolution when the camera is at the second position than when the camera is at the first position.

13. The apparatus of claim 11, comprising a moveable transparent camera cover operatively connected to the touch sensor to engage the linkage mechanism to rotate upon slidable movement of the touch sensor.

14. The apparatus of claim 11, comprising a bumper mechanism operatively connected to the camera.

15. The apparatus of claim 11, wherein the camera is retractable to cause the linkage mechanism to become actuated to cause the touch sensor to slide over the camera.

16. An apparatus comprising:
a housing;
a touch sensor positioned on the housing to detect a presence of a fingerprint associated with an authentication operation;
a linkage mechanism positioned within the housing and below the touch sensor, wherein the linkage mechanism is to rotate upon slidable movement of the touch sensor;
a camera positioned in the housing and operatively connected to the linkage mechanism to capture an image of the fingerprint; and
a processor to perform the authentication operation using the image of the fingerprint,
wherein the camera is to slide out of the housing upon rotation of the linkage mechanism to perform a media-capturing operation.

17. The apparatus of claim 16, wherein the camera is to operate in a fingerprint-sensing mode upon being positioned in the housing and below the touch sensor, and wherein the camera is to operate in a media-capturing mode upon being positioned to slide out of the housing and above a surface of the housing.

18. The apparatus of claim 16, comprising a light source connected to the linkage mechanism and positioned to direct light towards the touch sensor to enhance an illumination of a detected fingerprint on the touch sensor to permit the camera to capture the image of the fingerprint.

19. The apparatus of claim 18, wherein upon the touch sensor detecting the presence of the fingerprint, the touch sensor is to activate operation of the light source and the camera, and wherein upon the processor identifying the fingerprint, the processor is to deactivate operation of the light source and the camera.

20. The apparatus of claim 16, wherein upon the camera sliding out of the housing, the processor is to activate operation of the camera, and wherein retraction of the camera back into the housing is to cause the processor to deactivate operation of the camera.

* * * * *